United States Patent [19]
Ackley

[11] Patent Number: 5,389,770
[45] Date of Patent: Feb. 14, 1995

[54] METHOD AND APPARATUS FOR DECODING UNRESOLVED BAR CODE PROFILES

[75] Inventor: H. Sprague Ackley, Seattle, Wash.

[73] Assignee: Intermec Corporation, Everett, Wash.

[21] Appl. No.: 8,769

[22] Filed: Jan. 22, 1993

[51] Int. Cl.⁶ ............................................. G06K 7/10
[52] U.S. Cl. ..................................................... 235/462
[58] Field of Search .......................... 235/462, 463, 470

[56] References Cited

U.S. PATENT DOCUMENTS

| | | | |
|---|---|---|---|
| 1,985,035 | 12/1934 | Kermode et al. | 209/111 |
| 2,612,994 | 10/1952 | Woodland et al. | 209/111 |
| 3,359,405 | 12/1967 | Sundblad | 235/61.11 |
| 3,622,758 | 11/1971 | Schanne | 235/61.11 |
| 3,784,792 | 1/1974 | Dobras | 235/463 |
| 4,013,893 | 3/1977 | Hertig | 250/568 |
| 4,379,224 | 4/1983 | Engstron | 235/463 |
| 4,916,298 | 4/1990 | Raphael | 235/470 X |
| 4,980,544 | 12/1990 | Winter | 235/462 X |
| 5,080,456 | 1/1992 | Katz et al. | 235/462 X |
| 5,231,293 | 7/1993 | Longacre, Jr. | 250/568 |
| 5,276,315 | 1/1994 | Surka | 235/462 |

OTHER PUBLICATIONS

*ANSI X3.182-1990 Bar Code Print Quality Guideline,* Intermec Corporation, Nov. 7, 1990, Rev.D.

Intermec, *Substrate Distortion—Historical Papers by IBM and RCA,* Rev. A, Dec. 4, 1991, "Report on Unsymmetrical Signals in the Supermarket Scanner", L. J. Nicastro, Jan. 21, 1970, and The Shrinking White Bar Effect observed in the Piranha bar code scanner, Apr. 10, 1973.

"Effects of substrate scattering on bar-code scanning signals", Eric Barkan and David Skiar, *SPIE* vol. 362, 196–212.

"Depth of modulation and spot size selection in bar code laser scanners", Eric Barkan and Jerome Swartz, SPIE'S 25th Annual International Technical Symposium.

*Primary Examiner*—John Shepperd
*Attorney, Agent, or Firm*—Seed and Berry

[57] ABSTRACT

A quantitative peak and valley location decoding method for variable length Code 39 and I2/5 that can extract data from profiles that do not resolve the narrow elements is described. The method is applied to a four and eight character Code 39 symbol, and a four digit I2/5 symbol, and is generic for any two-width symbology. The usable depth-of-field performance of a projected aperture scanning device and a video imaging device is shown to be improved by 300 percent using this decode method.

68 Claims, 25 Drawing Sheets

METHOD AND APPARATUS FOR DECODING UNRESOLVED BAR CODE PROFILES

TECHNICAL FIELD

This invention relates to a method and apparatus for decoding bar codes and, more particularly, to a method and apparatus for decoding unresolved bar code profiles.

BACKGROUND ART

A bar code reader typically uses a beam of light or imager to read a bar code, which consists of alternating strips ("bars") of differing reflectivities. The scanner then receives and interprets the fluctuations in the returning light that are caused by the bar code. It is known in the prior art to read bar codes by means of a hand-held wand which makes contact with the surface on which the bar code is printed. However, the need to make contact with the surface is frequently inconvenient and sometimes gives uninterpretable readings because the wand is not moved across the bar code with a sufficiently uniform velocity.

An alternative to a hand-held wand is a bar code scanner which does not require physical contact with the bar code which is to be read. While a hand-held wand and a bar code scanner both read bar codes with a beam of light, a bar code scanner typically produces a beam of light which is repetitively scanned across an area to an imager. It may also read a bar code with a charge-coupled device (CCD) scanner, one-dimensional or two-dimensional. In laser scanners, the beam of light can be produced by a laser source, such as a laser diode light source 30 in FIG. 29. If the beam of light from any type of scanner intercepts a bar code (or some other symbology), the modulated light which is reflected by the bar code is returned to sensing circuitry in the bar code scanner for interpretation. A record of the modulated light signal is called a bar code symbol reflectance profile. The strength of the modulated light signal is a function of the reflectances of the bars and spaces in the bar code, and the distance between the scanner and the bar code.

Nearly all scanners incorporate circuitry (the wave shaper) which converts the received signal into a digital pulse train, having a well controlled amplitude. The wave shaper picks a location on the received signal corresponding to a change of reflectance. The modified signal is analyzed on the basis of relative time. That is, the widths of the alternating areas of different reflectivity are measured on the basis of their relative scanning times. This allows the reader to be used with bar codes which have a wide variety of sizes, the important factor being that the relative widths of the elements of the bar codes be preserved. Accordingly, it is preferable that the light beam be scanned across the bar code at a substantially uniform rate in order to ease the task of interpreting the bar code.

The peaks and valleys in the symbol profile before shaping which is read by a scanner contain information regarding the relative positions and the relative intensity of the reflected light from the bars and spaces which make up the symbol. However, the information is corrupted because of the presence of noise or by a scanner operating beyond a range suitable for proper operation of the wave shaper circuitry. This noise may be especially destructive to the information contained in the narrow bars and spaces. However, the inventor has learned that fortunately the coding used in popular two-width machine readable symbologies contains a significant amount of redundancy, so that resolution of the wide bars and spaces is sufficient to allow the symbols to be decoded. Accordingly, the present invention allows a given bar code symbol to be read at distances significantly beyond the normal range of resolution of a given scanner and allows high-density symbols to be read by scanners not normally able to do so. At the same time, the method of the present invention does not depend upon complex mathematics and does not require knowledge about the scanner.

DISCLOSURE OF THE INVENTION

In one aspect, the invention is an apparatus for decoding a machine readable symbol representing encoded information. The machine readable symbol includes a plurality of relatively spaced two-dimensional geometric shapes, some of the geometric shapes having a greater extent in at least one dimension than the remaining geometric shapes. The apparatus comprises means for receiving light that is reflected from the machine readable symbol and producing a shape signal therefrom, and means for processing processor 36 the shape signal and producing a signal indicative of the information encoded in the machine readable symbol.

In another aspect, the invention is a method for decoding a machine readable symbol representing encoded information. The machine readable symbol includes a plurality of relatively spaced geometric shapes, some of the geometric shapes having a greater extent in at least one dimension than the remaining geometric shapes. The method comprises the steps of: (a) receiving light that is reflected from the machine readable symbol and producing a shape signal therefrom; and (b) processing the shape signal and producing a signal indicative of the information encoded in the machine readable symbol.

In a further aspect, the invention is an apparatus for decoding a machine readable symbol representing encoded information. The machine readable symbol includes a plurality of relatively spaced two-dimensional geometric shapes, some of the geometric shapes having a greater extent in at least one dimension than the remaining geometric shapes. The apparatus comprises means for receiving light that is reflected from the machine readable symbol and producing an output signal therefrom sensor 32, means for receiving the output signal and producing large shape signals indicative of at least one of the spacings and the extents of the geometric shapes in the machine readable symbol having the greater extent in at least one dimension than the remaining geometric shapes converter 34, and means for processing the large shape signals and producing a signal indicative of the information encoded in the machine readable symbol processor 36.

In a still further aspect, the invention is a method for decoding a machine readable symbol representing encoded information. The machine readable symbol includes a plurality of relatively spaced geometric shapes, some of the geometric shapes having a greater extent in at least one dimension than the remaining geometric shapes. The method comprises the steps of: (a) receiving light that is reflected from the machine readable symbol and producing an output signal therefrom; (b) receiving the output signal and producing large shape signals indicative of at least one of the spacings and the extents of the geometric shapes in the machine readable symbol having the greater extent in at least one dimension than the remaining geometric shapes; and (c) processing the large shape signals and producing a signal indicative of the information encoded in the machine readable symbol.

BEST MODES FOR CARRYING OUT THE INVENTION

Figure 1:
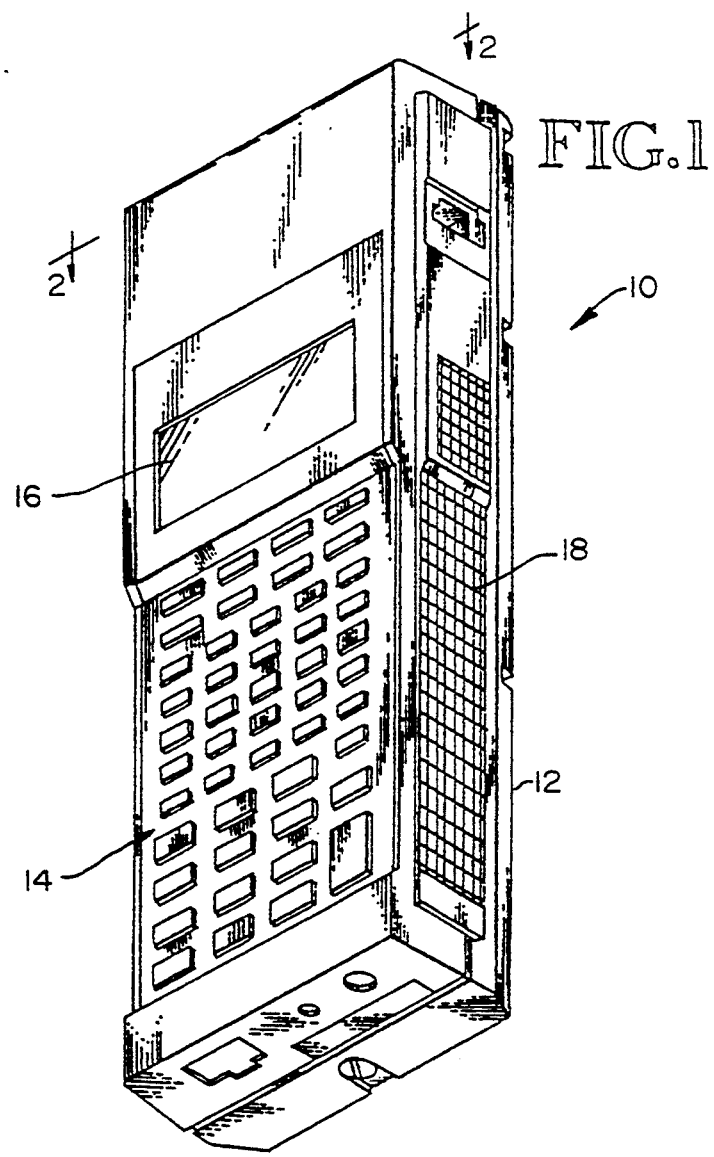
FIG. 1 is a perspective diagram of a scanning laser bar code reader of the type embodying the present invention.
Figure 2:
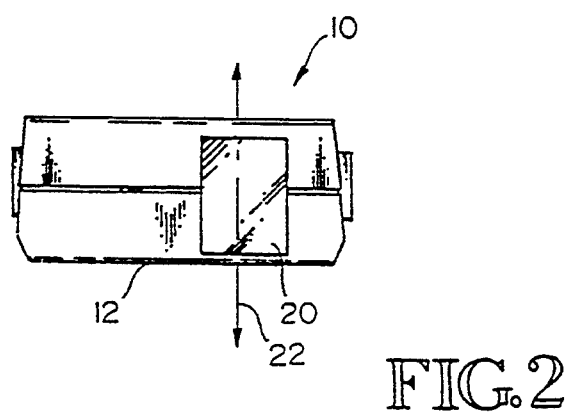
FIG. 2 is an end-on view of the top end of the scanning laser bar code reader shown in FIG. 1.
Figure 29:
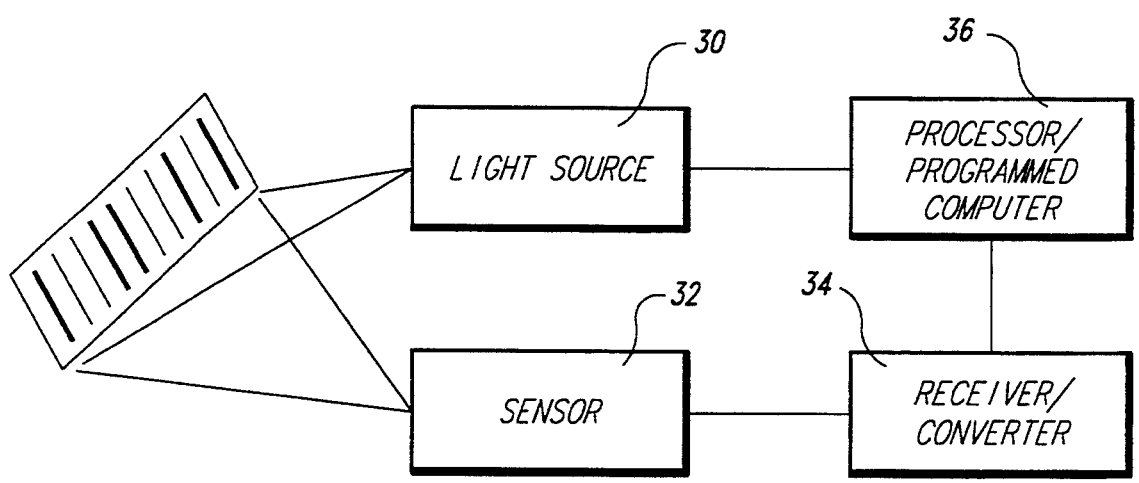
FIG. 29 is a block diagram of an example of an apparatus for decoding unresolved bar code profiles under the present invention.

One embodiment of a laser scanner of the type with which the invention circuit is intended to operate is shown in FIGS. 1 and 2. FIG. 1 is a perspective diagram of the laser scanner. FIG. 2 is an end-on view of the top end of the laser scanner shown in FIG. 1. The laser scanner 10 contains electronic circuitry and optical components contained within a case 12. It includes a keyboard 14 and liquid crystal display (LCD) 16 for the display of bar codes (or other machine readable symbols) which have been read by the laser scanner 10 as well as for programming a microprocessor (shown as 36 in FIG. 29) contained within the laser scanner 10. Two popular bar code symbols are Code 39 and Interleaved 2 of 5 (I2/5).

Figure 27A:
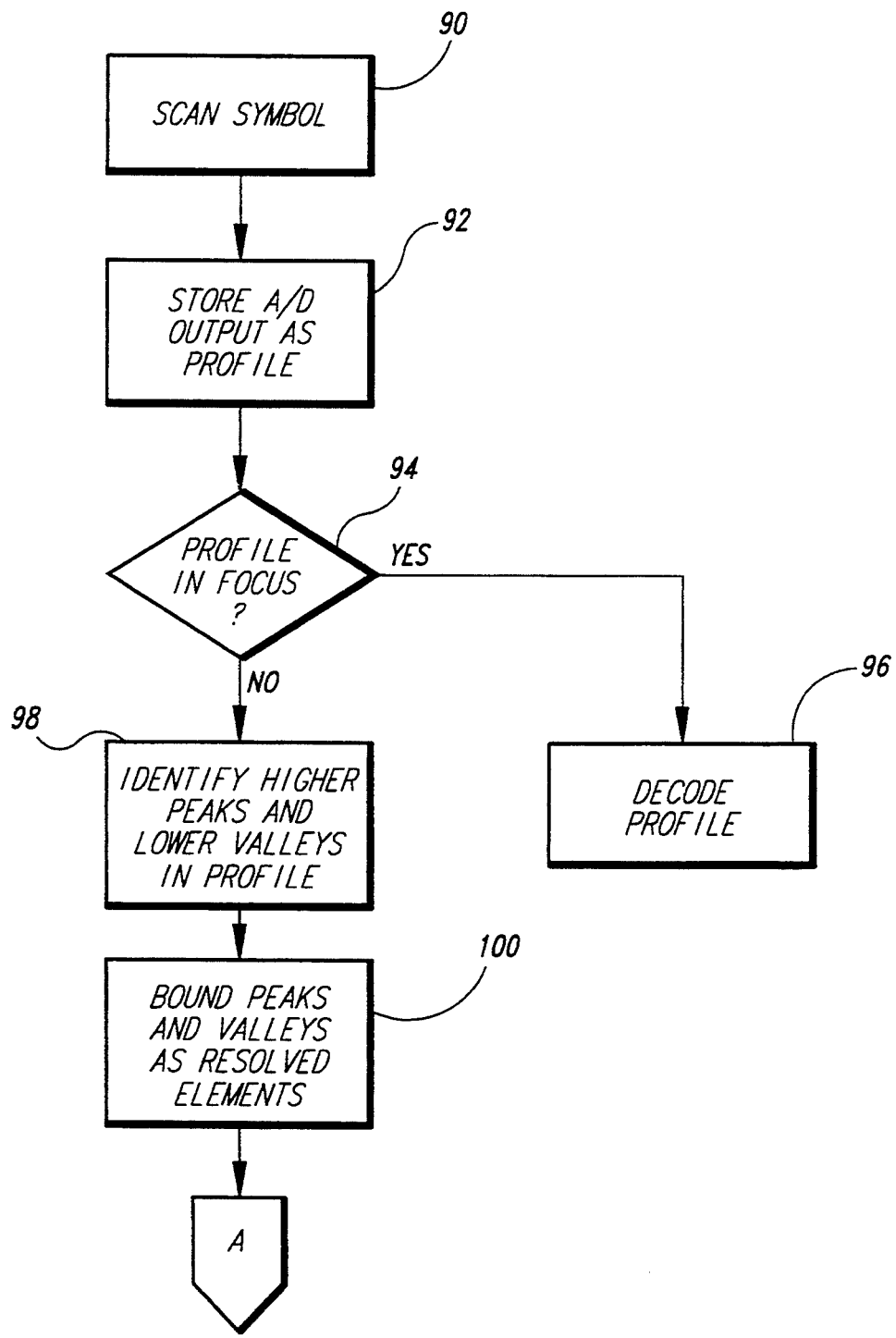
FIGS. 27A and 27B are flow charts showing the method of decoding unresolved bar code profiles under the present invention.

Upon actuating a pair of opposed triggers 18 (one shown in FIG. 1), the laser scanner 10 is activated to produce a scanning beam (not shown) of laser light step 90 in FIG. 27A. The scanning beam passes through the window 20 placed in the top end of the laser scanner 10, as shown in FIG. 2. The scanning occurs in the plane 22 (shown in FIG. 2). The light from the scanning beam is projected forwardly of the laser scanner 20. If it reaches a surface, some of the impinging energy returns to the window 20. If the reflecting surface happens to contain bar code symbology which the scanning laser beam impinges upon, the returning light will be modulated to form a series of peaks and valleys by the pattern of reflectivities which the bar code symbology contains. The laser scanner 10 includes a sensor 32 or means for receiving light (e.g., scanning laser beam light) that is reflected from the bar code symbology. The sensor 32 produces an output signal that has an amplitude indicative of the reflectivity of the portion of the bar code symbology being scanned, the duration of the amplitude being indicative of a width of a bar or space in a portion of the bar code symbology being scanned. A record of the modulated light, called a profile, is stored in the reader memory step 92 in FIG. 27A. The light received by the laser scanner 10, if it is reflected from a bar code symbology, can be amplified and processed by circuitry that will be described in greater detail subsequently.

A machine readable symbol is comprised of a number of geometric elements. In the case of some bar code symbols, the elements are parallel bars and the spaces therebetween; the elements have exactly two different possible widths. The number of elements for any given symbol is a function of the method used to determine the elements, i.e., the method of reading the symbol. One useful method, called "waveshaper," finds an element edge at the point where the reflectance has reached a fixed difference from a peak or valley. The result of its action is similar to that of a conventional electronic waveshaping circuit. A first pass waveshaper decodes all the elements in the profile generated from a Code 39 or I2/5 symbol if the profile is in focus.

A receiver or converter 34 in the laser scanner 10, includes the reader memory noted above and additional circuitry for receiving the output signal from the sensor 32 and producing a wide feature signal or profile that represents at least two of the widths of the bars and spaces in the bar code symbology that is scanned by the laser scanner. Since profiles are retained in a memory of the laser scanner 10 as a string of reflectance level values, they may be analyzed any number of times. A profile that has an incorrect number of elements after analysis with a first pass waveshaper may be re-evaluated with a larger waveshaper reflectance difference. Nonexistent apparent elements caused by defects that are smaller than the second pass waveshaper will then be distinguished from correct elements. A series of increasing waveshaper values can be tried by a waveshaper method until the correct number of elements is reached. Alternately, symbols with poor print quality such as those with ink spread and very low contrast can be evaluated with a waveshaper having a variable level threshold to optimize the decode. Ultimately, an edge finding software program for detecting the edges of the elements in a machine readable symbol can be taught to recognize an arbitrary number of specific symbols that are not decodable by a conventional electronic waveshaping circuit.

Closure bar code profiles are distinguished by a lack of resolved narrow elements that appear in a localized reflectance region and by the existence of resolved wide elements. In closure bar code profiles, the remains of groups of narrow elements form clusters in a horizontal reflectance band in the middle of the profile, between the thresholds for detection. The band is bounded at its upper and lower limits by the reflectance values of single lost narrow elements that are separated by like wide elements. Therefore, the reflectance peaks and valleys of similar wide elements that are separated by a narrow element appear to be adjacent in a closure profile. The reason is that the narrow element between adjacent wide elements has a small reflectance difference relative to the contrast of the wide elements and is, accordingly, not detected.

The wide elements are the only ones which extend near the top and bottom of the profile. Resolved wide elements can be found by a relatively low reflectance value first pass waveshaper step 98 in FIG 27A. In this case, reflectance values chosen need to be larger than the electrical noise but small enough to detect every peak or valley on the top and bottom of the profile. Unresolved narrow elements will also be found with a small waveshaper value, but they can be easily distinguished by their small element contrast and by the fact that their reflectance values are located in the middle of the profile.

A profile which has been subjected to an analysis of the change in reflectance in one direction (i.e., from high reflectance toward lower reflectance) can be also analyzed from the other direction. A reverse pass of the stored values describing the symbol can serve to bound the resolved wide elements as well as to bound the symbol itself step 100 in FIG. 27A. For instance, the waveshaper values applied from the left and the right specify a wide element peak with a mark a few reflectance points away from the extreme value on each side. The center of the wide element is laterally halfway between the specified points step 102 in FIG. 27B. The decode measurement method counts the lateral distances between the wide element centers, as opposed to typical electronic waveshaper circuits which measure the width of each element. The symbol begins and ends, for the purpose of the decode, at the point where the waveshaper first finds an edge in each of the two directions of analysis, or in other words, at the waveshaper reflectance drop point from the quiet zones. Further clarification of wide element location and lateral measurement counts may be found with the examples from FIGS. 4 and 5. The value of the first pass waveshaper is an adjustable parameter. A value of 0.07 of the overall symbol contrast (SC) appears to be satisfactory on a variety of closure profiles.

Figure 27B:
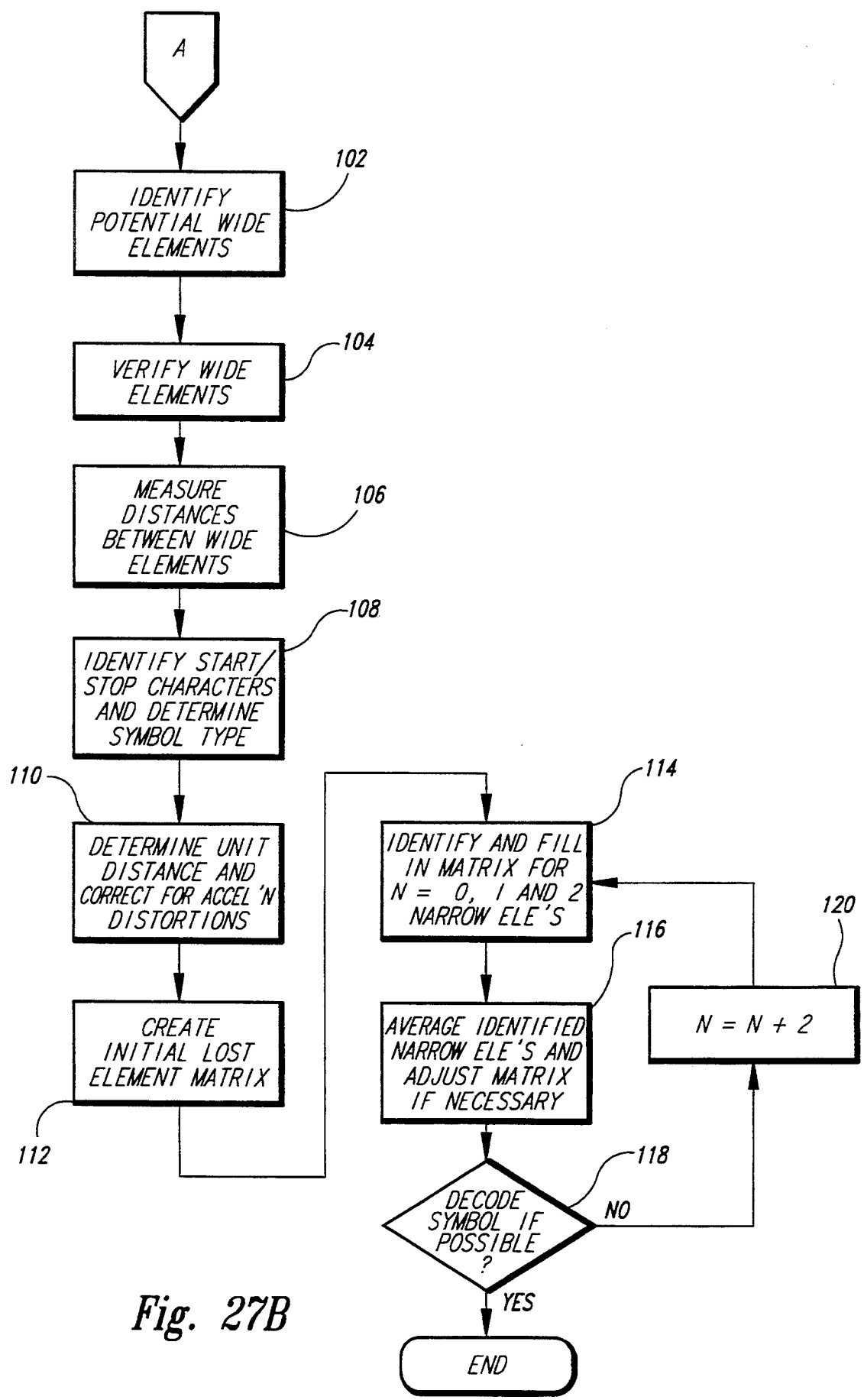
Figure 28:
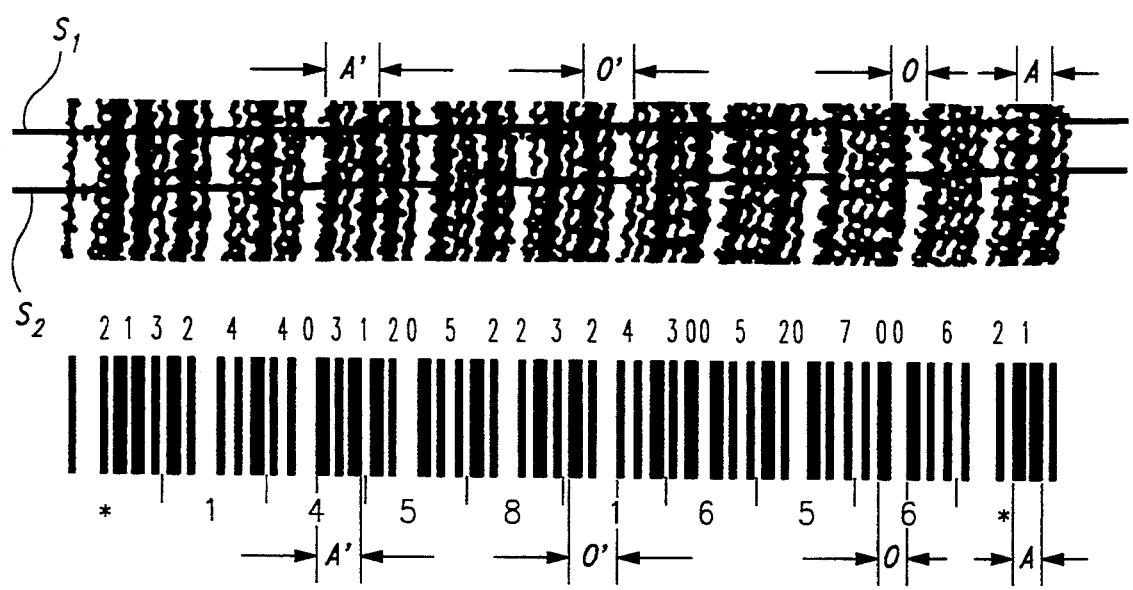
FIG. 28 shows the bar code of FIG. 8 above and aligned with the bar code of FIG. 11, with laser scan lines $S_1$ and $S_2$ through the bar code, where adjacent wide elements A and opposite wide elements O are shown for the two bar codes.

After the wide elements of a symbol are isolated, a goodness test can be performed to make sure that only valid wide elements have been identified step 104 in FIG. 27B. The reflectance values for the wide bars should be very consistent from bar to bar. Specifically, no correct wide bar should vary from the lowest reflectance in the symbol by more than the waveshaper variation. The wide space consistency should be good, also. A reasonably stringent test is that like resolved wide elements fall within 0.07SC of one another.

Once the wide elements of a symbol are located, their position relative to one another and the ends of the symbol profile can be used to orient the symbol and then determine the type of symbology steps 106 and 108 in FIG. 27A. I2/5 and Code 39 end in the same fashion, with a wide bar and two narrow elements then a quiet zone. In the case of both symbologies, the lateral distance from the quiet zone to the nearest wide bar is smallest for the stop character. For Code 39 and sometimes for I2/5, there are adjacent wide bars at the end of the symbol which are centered in a symmetric wide space pattern (from the last wide space to the quiet zone). In the beginning of the symbol, Code 39 always has adjacent wide spaces (the quiet zone is separated from the first wide space by a single narrow bar). The first Code 39 lateral measurement on the left should be nearly equal to the third lateral measurement which is also from adjacent wide elements. In addition, for fixed length I2/5, the correct number of wide bars is equal to $2N+1$ and spaces is equal to $2N$ for $N=1, 2, 3, \ldots, 24$.

For any given pair of wide elements in Code 39 and I2/5 symbols and any two-width symbologies, including but not limited to, Codabar, MSI, and Plessey, a fixed number of narrow elements (from 0 to 13) may be present. Zero elements are present when a wide space is next to a wide bar and vice versa. In reflectance terms, if a wide bar is directly opposite a wide space, then zero narrow elements are present, and if it is farther separated then the next possible number of included narrow elements is two. One narrow element cannot be present between opposite wide elements, i.e. between a wide bar and a wide space. But if reflectance peaks or valleys are adjacent (which occurs when wide bars are next to wide bars and when wide spaces are next to wide spaces), then a single narrow element can be present. The next possible number of narrow elements between like wide elements is three. For all spacings between wide elements, in reflectance terms there are always an even number of lost narrow elements between opposite wide elements and an odd number of lost narrow elements between adjacent wide elements.

Code 39 Unit Calculation

The start and stop characters for Code 39 offer a powerful yardstick for determining the lost elements of a symbol. There are three useful start character measurements. The first measurement is the lateral distance from the quiet zone to the center of the wide space. The second measurement is from the center of the wide space to the center of the first wide bar. The third measurement is the center-to-center spacing of the wide bars. The first measurement count and the third count are both distances between adjacent wide elements and consequently will have a similar width. Also the first and third counts each enclose a single narrow element. The second count in the start character is between opposite wide elements and is known to contain two narrow elements and the second measurement is larger than the first and third by a single narrow element width. Therefore the difference in count between the start character measurements provides a single narrow element or unit size comparison step 110 in FIG. 27B.

Similarly, the stop character offers two opposite wide elements which enclose a pair of narrow elements and a single adjacent pair of resolved wide elements. Besides being useful for establishing a unit measurement, the adjacent wide element (AWE) counts can be used to judge acceleration of the scanning beam in order to remove the lateral measured count distortion.

The unit measurement, which is the difference between the first and second lateral measured counts in the Code 39 start character, can be used to construct a lost element finding matrix step 112 in FIG. 27B. A lost element matrix is assembled starting with the second entry, which is based on the measurement of the AWEs in the start/stop pattern. This pattern contains a single narrow element. The other start and stop measured distance, opposite wide elements, is the third entry of the matrix. The rest of the matrix is assembled by adding (or subtracting) the unit value, which is the difference between the second and third matrix values. The unit value represents the width of a lost narrow element. The matrix is detailed below in Table 1.

TABLE 1

| Element Lost | Measured Distance | Lost Element Parity |
|---|---|---|
| 0 | AWE-unit | E |
| 1 | AWE | O |
| 2 | AWE + unit | E |
| 3 | AWE + 2*unit | O |
| 4 | AWE + 3*unit | E |
| 5 | AWE + 4*unit | O |
| . | . | . |
| . | . | . |
| . | . | . |
| 12 | AWE + 11*unit | E |
| 13 | AWE + 12*unit | O |

Lost Element Matrix Format

In order to determine the number of lost elements, compare the measured count to the matrix table above, and the closest values with the appropriate element parity is the correct number of lost elements.

I2/5 Unit Calculation

For the I2/5 symbology, the stop count can be used to find wide element pairs which do not enclose unresolved narrow element pairs. Since the transition from the stop wide bar to the quiet zone contains exactly one element pair, those distance counts which are materially less than the stop count do not contain any unresolved narrow element pairs. An adjustable parameter can be used to determine the range about the stop count which can be reasonably expected to distinguish counts which are materially less than the stop count. Plus and minus ten percent is apparently a good starting point for the stop decode tolerance, so that those counts that are less than the stop minus ten percent are considered to be free of unresolved element pairs. If a wide space and bar are next to each other, no narrow elements are present, whereas adjacent like wide elements are separated by an unresolved single narrow element.

Using the stop count tolerance of plus or minus ten percent, single element pairs can be located if the count between wide elements is equal to the stop count. A decode can be reached at this point if all the counts adjacent to the stop count are equal to or less than the stop count. If an adjacent wide element count internal to the profile is greater than the stop count, it can be compared to a matrix that is similar to the Code 39 matrix constructed above. A unit measurement can be estimated as the stop distance divided by 3.25 and then reconfirmed by the difference of adjacent and opposite elements found in the profile which are a lesser count than the stop pattern. The stop count represents 3.5 modules in a symbol with N=3 and 3 modules in a symbol with N=2, and the value of 3.25 appears to work well with a variety of closure profiles.

A second goodness test of the correct narrow bar count and the proper reflectance characteristics of the unresolved elements may be advisable. The unresolved narrow element pairs should be in a region between unresolved single elements and usually in a relatively tight reflectance range. Twice the test value used to verify wide elements, 0.14SC, can be used as a window for confirming lost element groups.

A First Code 39 Closure Decode Example

Figure 3:
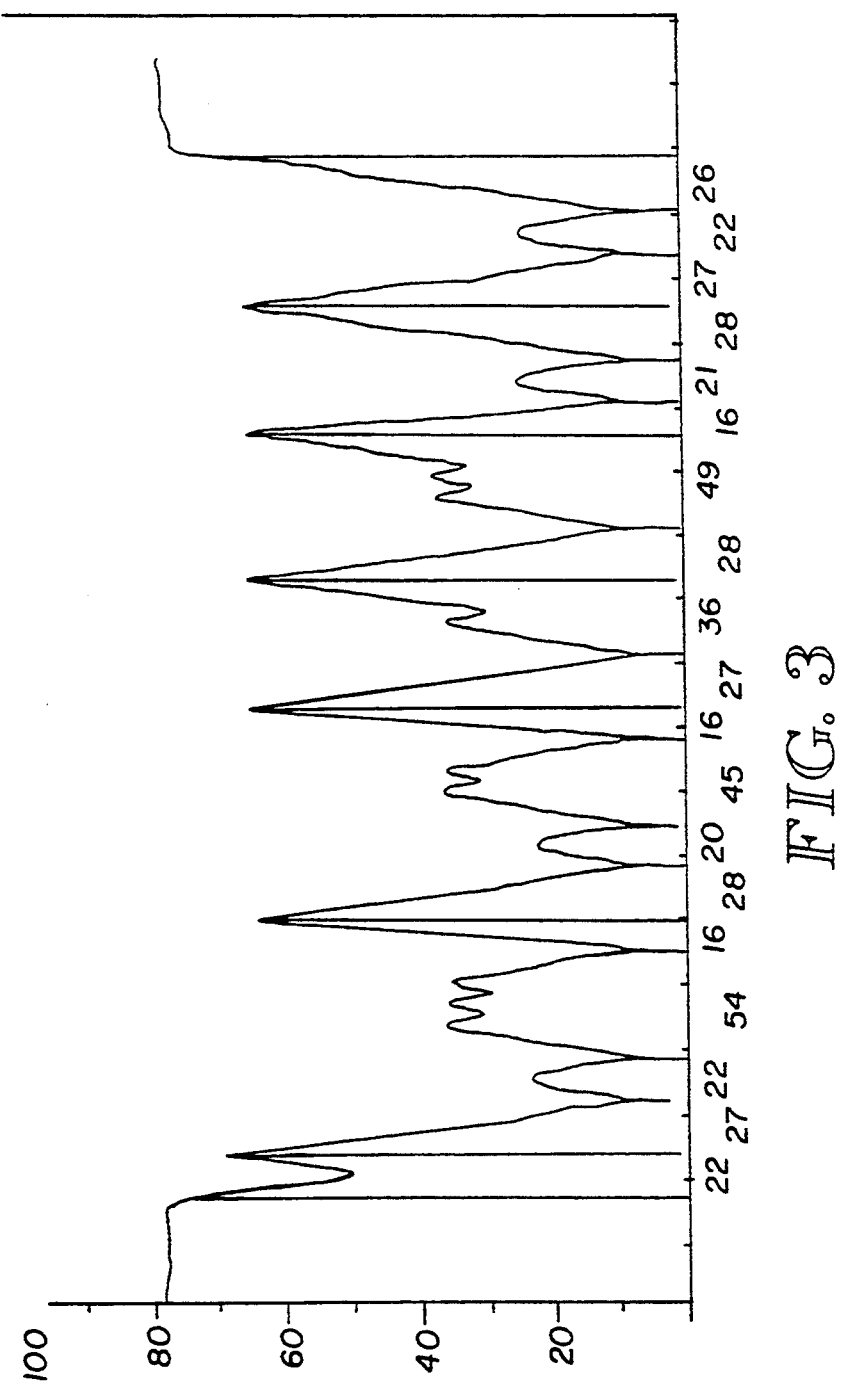
FIG. 3 is a first example of a method according to the present invention for locating the wide elements in a bar code symbol.

The reflectance profile in FIG. 3 was made by reading a good quality 10 mil Code 39 symbol with an unknown number of characters. This Code 39 symbol is viewed at a distance of 0.84 inches, which is 0.24 inches outside of the design limits of the Intermec 1301 fixed position focused aperture scanner used to read the symbol. The 1301 scanner has a depth of field of 0.2 inches. The out-of-resolution features are best demonstrated by the disappearance of the narrow elements and the existence of resolved wide elements which extend to the top or bottom of the profile range. The centers of the resolved wide elements are indicated as well as the distances between resolved wide elements. The difference between the first and second measured distances is a unit dimension which is used to construct a decode matrix.

The wide elements have been identified as those which extend to the top and the bottom of the profile. Those peaks and valleys which do not make it that far and consequently end up in the middle of the profile are not included. The centers of the wide elements are at the high points or low points of the profile but can be calculated more generically as the center of the points which are 0.07SC from each extreme. For FIG. 3, SC is about 70 percent, so the first pass software waveshaper method value is about 5 percent. Therefore the center of the wide elements is the point between scribe marks which are 5 percent below or above the element extremes.

The number of characters can be easily determined as the number of wide spaces and or half the number of wide bars after locating any special Code 39 characters which have a closure signature of three adjacent wide spaces. To determine character count, all instances of three adjacent wide spaces are subtracted before the remaining wide bars and spaces are counted. The profile cannot be I2/5, because the number of wide bars is not equal to the number of wide spaces plus one. The start pattern is on the left because the sum of the first two counts is larger than the last count. Also, the first count and the third count are nearly equal and the stop pattern is symmetric about the adjacent wide elements.

The difference between the first two counts (27–22) is 5, which may be used as a unit count. Alternatively, the second count could be subtracted from the average of the first and third count to obtain a unit measurement. The nearly identical spacing of the adjacent wide elements in the start and stop characters, as well as in the first and fourth data characters, indicates that no acceleration is present in the scan.

A lost element matrix can be established using the start/stop measurements and the calculated unit measurement. The first entries are 22 and 27, which are taken directly from the profile counts (lateral distances between wide elements) or may be calculated as an average. The unit value, 5, is subtracted from 22 to get the zero element entry. The remaining values are determined by successively adding 5 to the matrix count resulting in the following table. The lost element parity refers to the number of lost elements. See Table 2.

TABLE 2

| Lost Elements | Matrix Count | Lost Elt Parity |
| --- | --- | --- |
| 0 | 17 | E |
| 1 | 22 | O |
| 2 | 27 | E |
| 3 | 32 | O |
| 4 | 37 | E |
| 5 | 42 | O |
| 6 | 47 | E |
| 7 | 52 | O |

Lost Element Matrix Example From FIG. 3

Now each measurement from FIG. 3 can be compared to the matrix value and the appropriate lost element parity can be chosen. For instance, starting on the left, the measurement 54 is closest to the matrix value 52 and since the 54 is an adjacent element count then an odd number of elements must be present (in fact 7 elements in this case). Similarly, the measured distance 45 represents 5 lost elements. The measurement 36 is for opposite elements, so an even number must be present and the table can be consulted to determine that the missing number of elements is 4. Once the lost narrow elements are found the element pattern may be compared to a look-up table for a perfect match before a decode may be passed.

The realization that element count parity must be preserved adds considerably to the tolerance of this procedure to errors in the initial measured counts. The count values can be off by as much as a whole unit in either direction before an error can be made. For instance, the measured distance 54 would have to go up to 58 or down to 46 before a valid parity count that is incorrect is rendered. Even though this property makes the decode adequately robust, further refinement to the unit value can be made once the first several matrix entries are determined.

A Second Code 39 Closure Decode Example

In this example, a method for decoding Code 39 utilizing the center location of wide elements is described. The method does not use the direct counting of narrow elements and is generic for any two width symbology. The method can be used to improve the depth of field performance and useful X-dimension range of video scanners.

A video image typically has resolution limited X-dimensions on the order of the pixel size. When the X-dimensions become markedly smaller than the pixel size, convention dictates that the image is not decodable because the edges of the narrow elements cannot be determined. Similar restrictions exist when the aperture size of an optical system is near to or larger than the X-dimension.

In this example, the method for decoding single scan path profiles characterized by the disappearance of distinct narrow elements is applied to a Code 39 half tone newspaper image where the narrow elements appear to be a uniform gray. See FIG. 6.

As an overview of the decode process, the decode is based on the location of the centers of the wide elements. First the wide elements are located as the only resolved elements and then they are counted. For a Code 39 symbol with alphanumeric data, the number of wide bars should be equal to twice the number of wide spaces. Next, the distances between the wide elements are measured and a matrix of centers distances is created using the start and stop character distances as the first entries of the matrix. The narrow element counts for small centers distances are then identified and the matrix is built by iterating for larger element centers distances until all elements have been identified. A decode is then performed.

Figure 6:
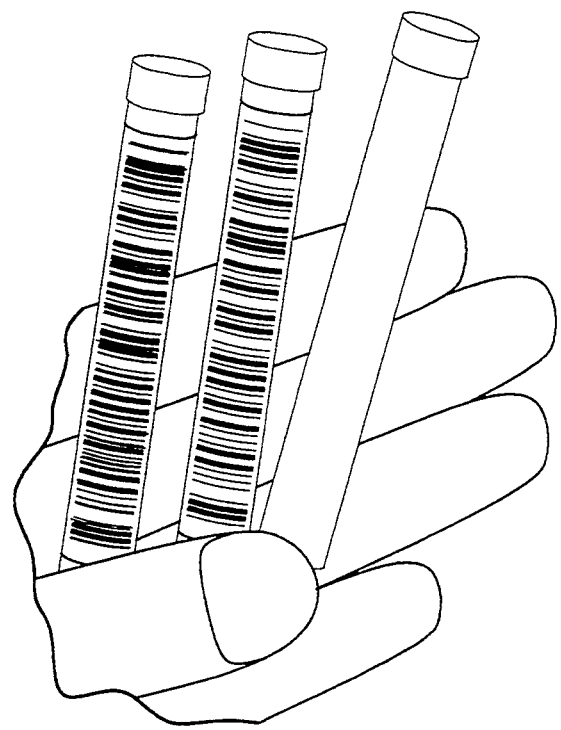
FIG. 6 is an example of a newspaper picture having two bar code symbols.

The right test tube in FIG. 6 has a somewhat clearer image due to the angle of the test tube and can almost be decoded directly by eye. The difficult part of the decode task comes with determining how many narrow elements exist in the gray areas between the distinct wide bars and spaces. A more reliable decode may be made by ignoring the narrow element gray areas and decoding the wide elements centers locations directly. The left test tube is difficult to decode by eye and would otherwise be ignored by an automated decoder which relies solely on the location of element edges for a decode.

The decode of the test tube on the right side of FIG. 6 is accomplished by the following eleven step process:

1. Count the wide bars and spaces and verify the parity for Code 39 step 102 in FIG. 27B. In this case there are twenty wide bars and ten wide spaces, indicating a legal Code 39 symbol with ten symbol characters.

Figure 7:
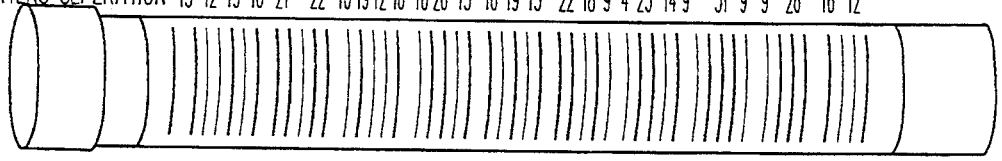
FIG. 7 is a blow-up of a portion of the newspaper picture shown in FIG. 6.

2. Label the wide elements as either bars (B) or spaces (S) and measure the average distance between them step 106. This is illustrated in FIG. 7, which is a blow-up of the test tube on the right hand side of FIG. 6, where the wide element types are identified (B or S) and the centers separations are measured.

3. Verify the presence of a Code 39 start and stop character of one wide space and two wide bars step 108.

Note the centers distances for the bar-to-space and bar-to-bar transitions and note any acceleration in the scan step 110. An initial matrix entry can be made for lost element counts of both the bar-to-bar spacing and the space-to-bar transition, from the knowledge of the start and stop character construction.

4. Create an interim lost element matrix for one and two lost elements, taken directly from the center location distances of the start and stop characters step 112.

This initial matrix is:

$$B\text{-}B,1\ 12 \quad B\text{-}S,2\ 15$$

where B—B means a wide bar next to another wide bar with no intervening wide spaces. B—S indicates a wide bar next to a wide space or vice versa. The "1" indicates that the particular like wide element pairing is that of two wide bars separated by a single narrow space. The "12" is the centers location distance taken from FIG. 7. The "2" indicates differing wide elements separated by a narrow bar and narrow space, or exactly two narrow elements. The centers distance is taken from FIG. 7 and is 15.

The difference between the two centers distances, 12 and 15, is the unit or X-dimension and is equal to 3. The B—S distance that contains no narrow elements, i.e. for a wide bar and space next to each other, can be estimated as the B—S distance for two missing elements minus two element X-dimensions or 15−6=9. Now the matrix has three entries.

$$B\text{-}S,0\ 9$$
$$B\text{-}B,1\ 12 \quad B\text{-}S,2\ 15$$

The next two entries in the matrix can be estimated to bound the identification of lost element sites of zero, one, and two elements by adding two X-dimensions to the lower two matrix values.

$$B\text{-}S,0\ 9$$
$$B\text{-}B,1\ 12 \quad B\text{-}S,2\ 15$$
$$B\text{-}B,3\ 18 \quad B\text{-}S,4\ 21$$

Note that when like elements are next to each other there can only be an odd number of missing narrow elements and when unlike wide elements are next to each other, only an even number of narrow elements are present.

Figure 8:
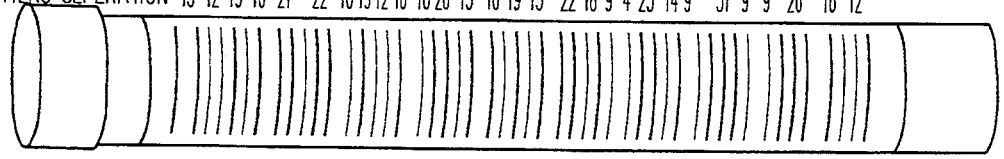
FIG. 8 is a reproduction of FIG. 7, with the lost element groupings of zero, one and two identified.

5. Identify the missing element locations for zero, one and two narrow elements as centers distances that are nearly the same as the matrix values step 114. For instance, the first distance after the start character is 19, which is too large to be a B—B single lost element. The next is 16, which is very close to the B—S value of 15, indicating two lost elements. FIG. 8 shows the bar code with the lost elements zero, one and two identified.

6. Average all the identified zero, one and two element locations and recompute the expected values for three and four lost elements as well as the unit value step 116. Also make an estimate at five and six lost elements for bounding purposes.

Average of 0's=9 (10, 10, 9, 9, 9, 9, 9)
Average of 1's=12 (12)
Average of 2's=15 (16, 16, 15, 16, 15, 14)

Therefore, no adjustment is required to the estimate of the 3's and 4's and the next level of the matrix is constructed to bound the choices for 3's and 4's.

$$B\text{-}S,0\ 9$$
$$B\text{-}B,1\ 12 \quad B\text{-}S,2\ 15$$
$$B\text{-}B,3\ 18 \quad B\text{-}S,4\ 21$$
$$B\text{-}B,5\ 24 \quad B\text{-}S,6\ 27$$

Figure 9:
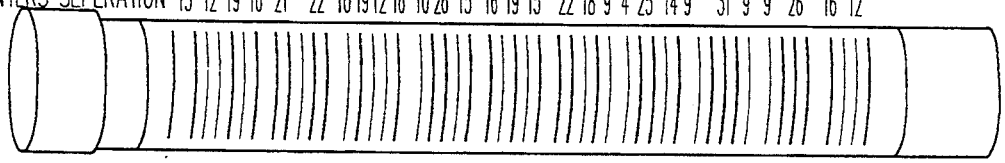
FIG. 9 is a reproduction of FIG. 7, with the lost element groupings of three and four identified.

7. Identify missing 3's and 4's and average their centers distances step 120. FIG. 9 shows the 3's and 4's identified, with their centers spacings.

Average of 3's=19 (19, 19, 19, 18)
Average of 4's=22 (21, 22, 22)

8. Modify the estimate of the next missing narrow elements set. Since the average figures are slightly different from the estimates used to determine them, a better estimate of the 5's and 6's can be made by using the calculated average values for the 3's and 4's and then adding two unit values. Note that the unit value, 3, calculated as the difference of the average 3's and 4's, is still the same.

9. Create the next level of the modified matrix and find the 5's and 6's.

$$B\text{-}S,0\ 9$$
$$B\text{-}B,1\ 12 \quad B\text{-}S,2\ 15$$
$$B\text{-}B,3\ 19 \quad B\text{-}S,4\ 22$$
$$B\text{-}B,5\ 25 \quad B\text{-}S,6\ 28$$
$$B\text{-}B,7\ 32 \quad B\text{-}S,8\ 34$$

Note that this matrix contains 3's and 4's which have been adjusted to equal the average values calculated in Step 7. Consequently, the estimates of the higher element counts are slightly greater than the last matrix.

Figure 10:
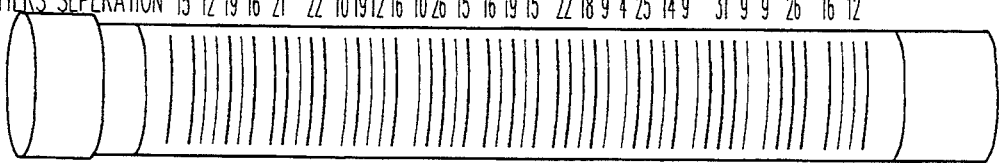
FIG. 10 is a reproduction of FIG. 7, with the lost element groupings of five and six identified.

10. Find the 5's and 6's. FIG. 10 shows the 5's and 6's identified. Note that the one 7 is obvious, which completes the task of identifying all the lost narrow elements. If center distances greater than 36 had been in the image, the iteration process would continue until all elements are identified steps 114 through 120.

Figure 11:
FIG. 11 is a representation of the bar code symbol shown in FIG. 7, where the narrow elements have been added between the wide ones and the characters have been delineated.
Figure 12:
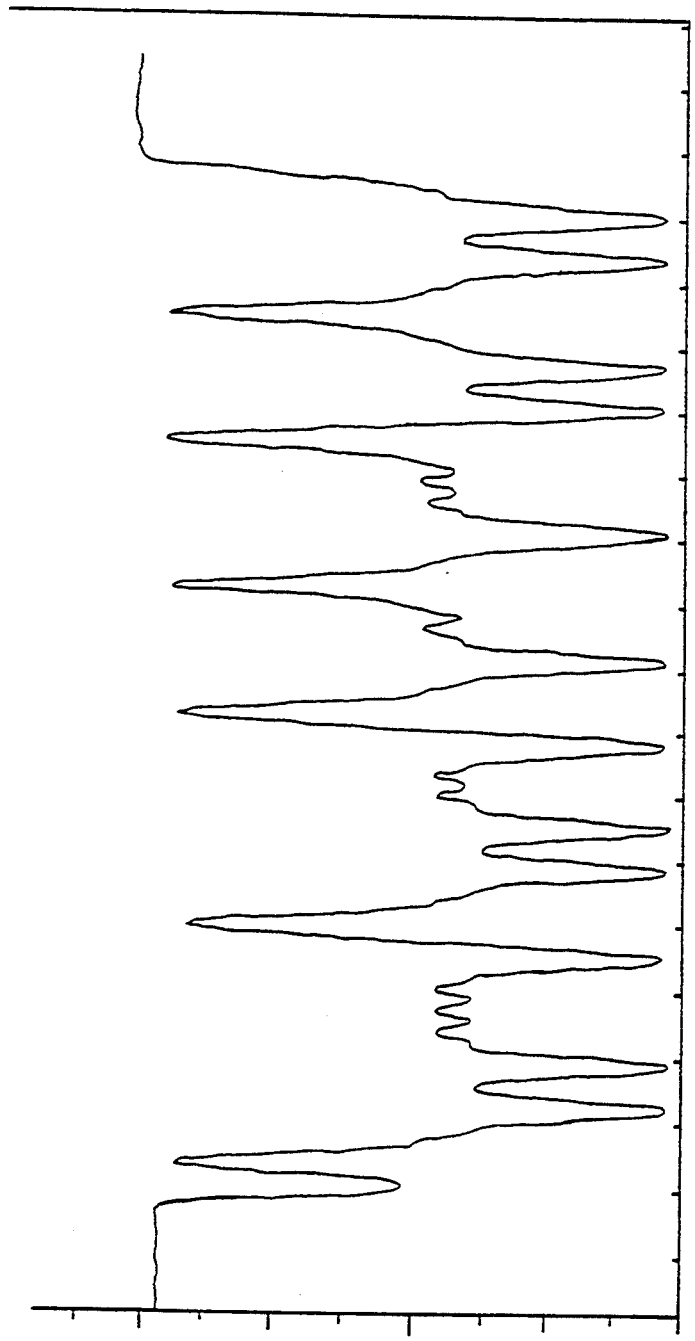
FIG. 12 is an example of the profile of a Code 39 symbol taken with a scanner at a distance of 0.21 inch from the symbol.
Figure 13:
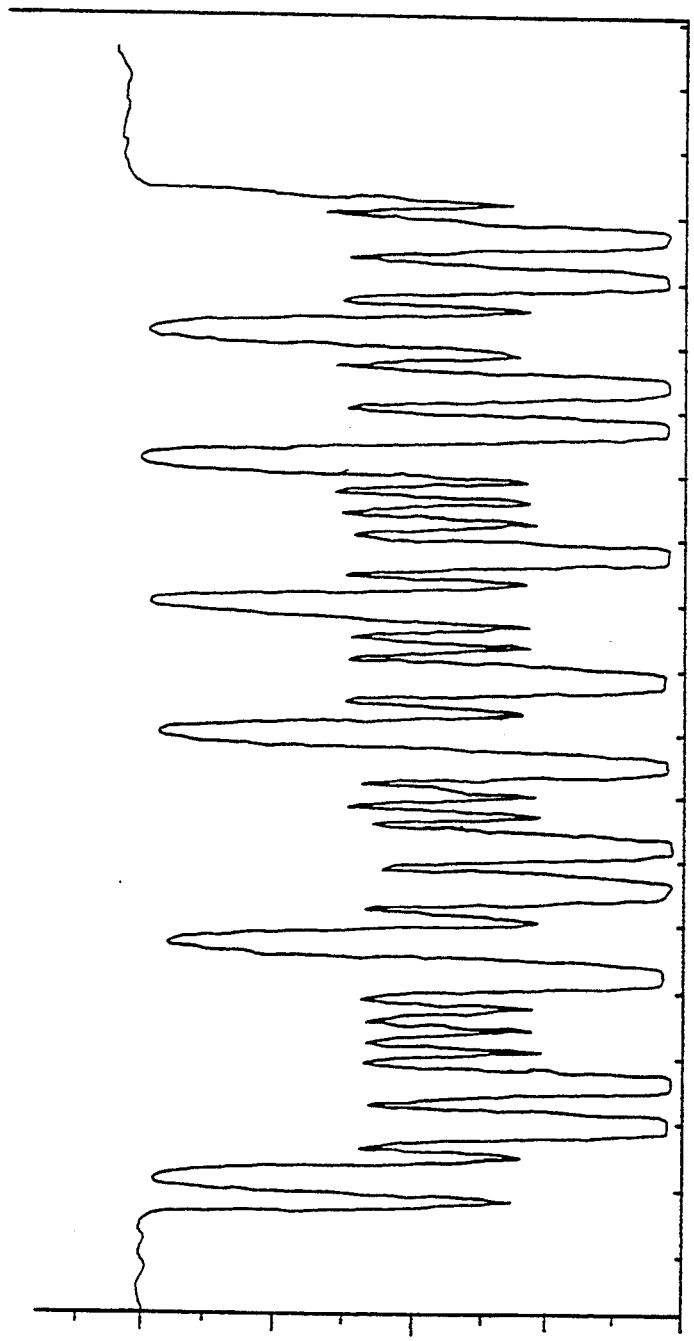
FIG. 13 is an example of the profile of a Code 39 symbol taken with a scanner at a distance of 0.31 inch from the symbol.
Figure 14:
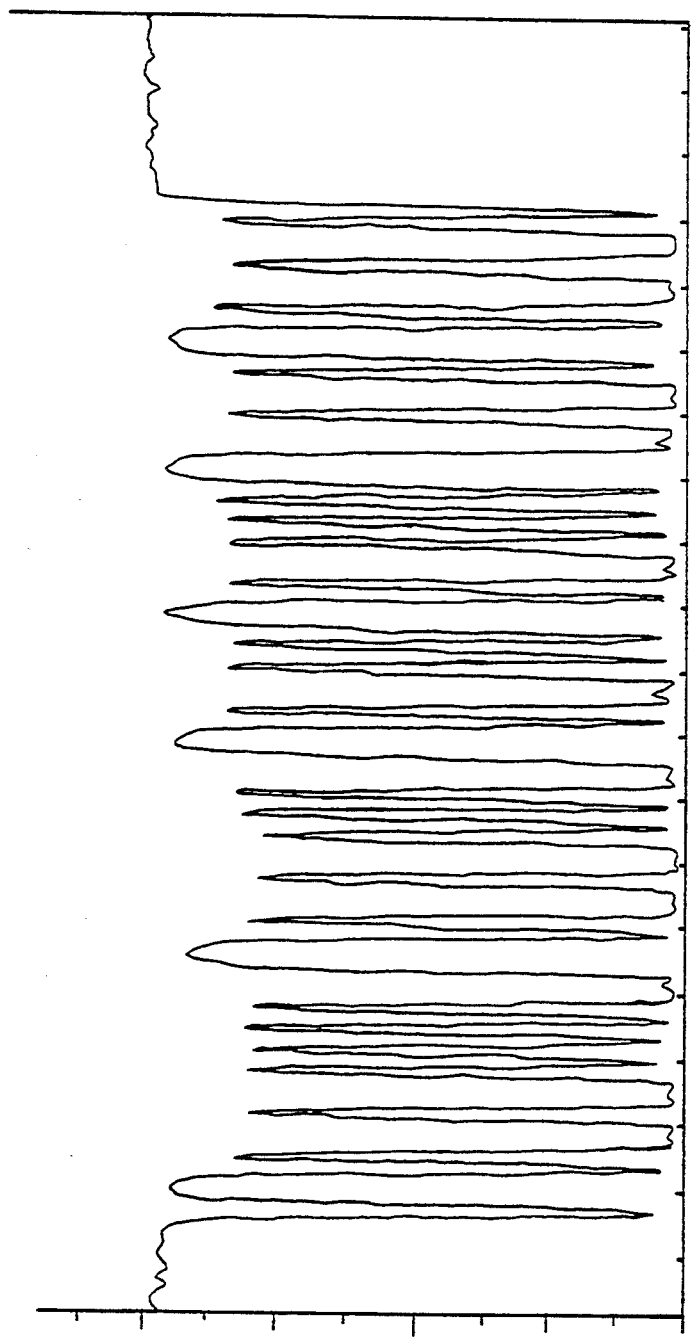
FIG. 14 is an example of the profile of a Code 39 symbol taken with a scanner at a distance of 0.41 inch from the symbol.
Figure 15:
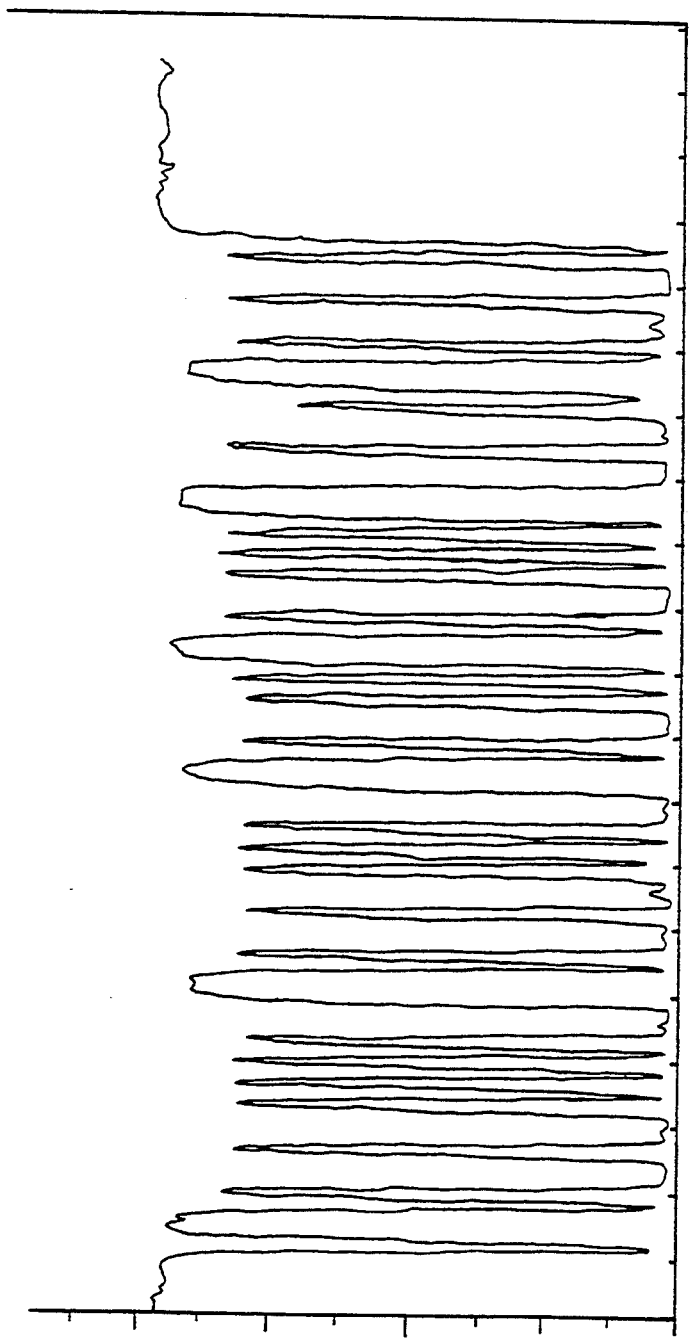
FIG. 15 is an example of the profile of a Code 39 symbol taken with a scanner at a distance of 0.50 inch from the symbol.
Figure 16:
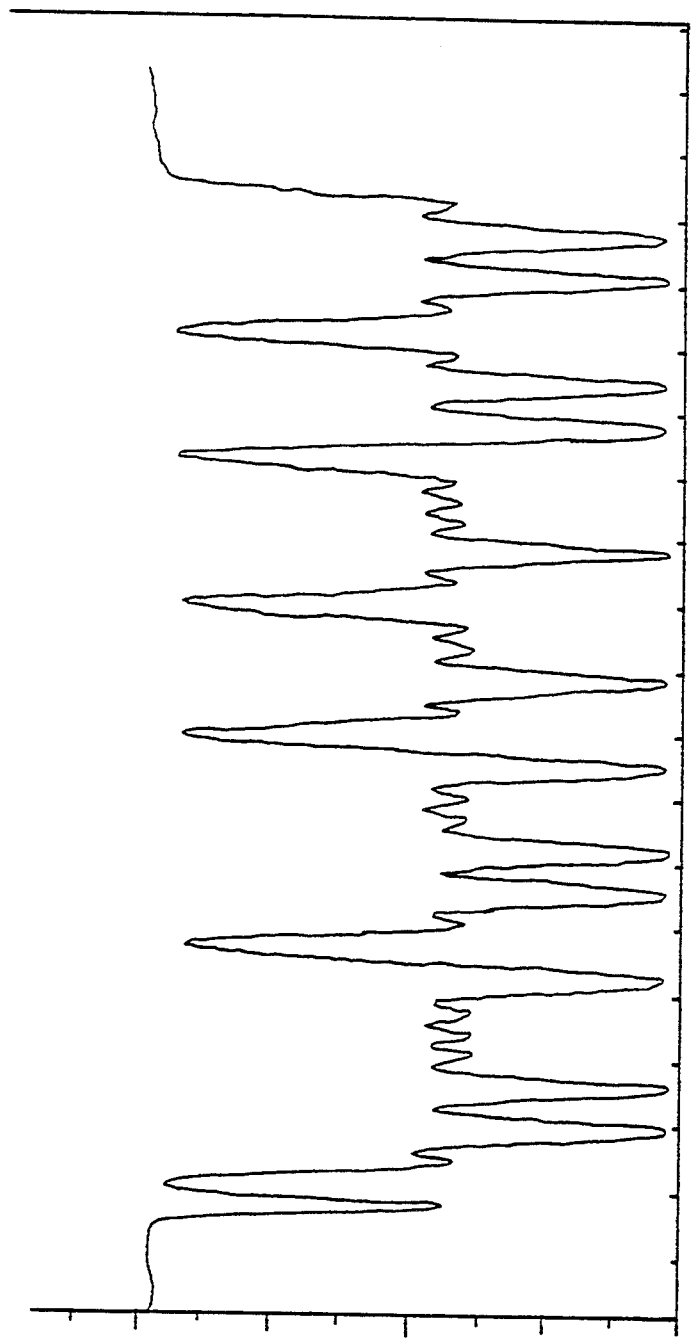
FIG. 16 is an example of the profile of a Code 39 symbol taken with a scanner at a distance of 0.69 inch from the symbol.
Figure 17:
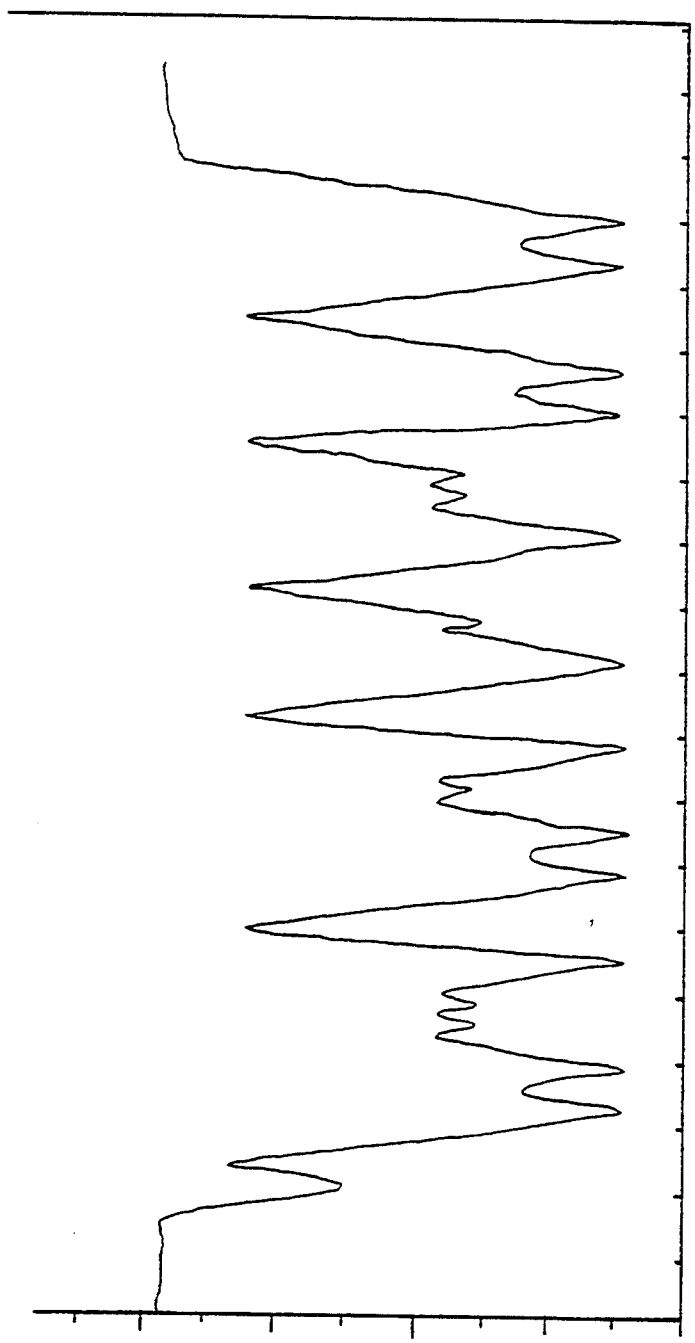
FIG. 17 is an example of the profile of a Code 39 symbol taken with a scanner at a distance of 0.84 inch from the symbol.
Figure 18:
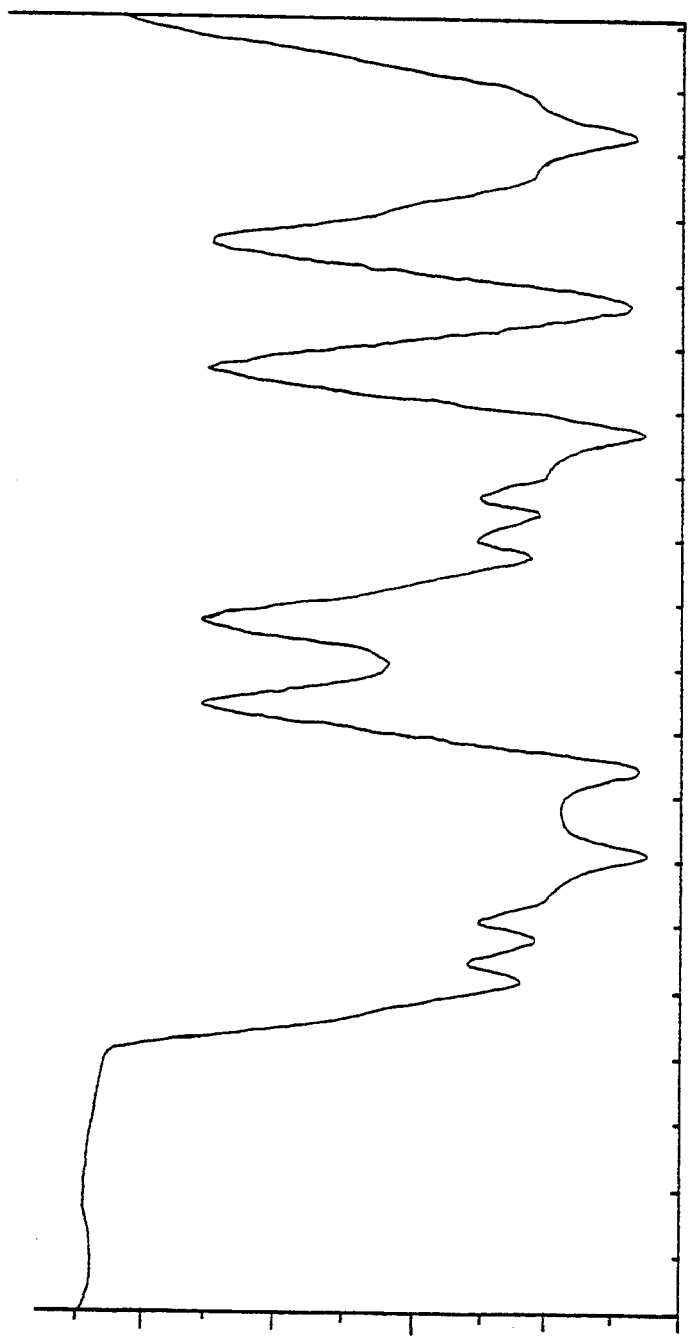
FIG. 18 is an example of the profile of a Interleaved 2 of 5 symbol taken with a scanner at a distance of 0.21 inch from the symbol.
Figure 19:
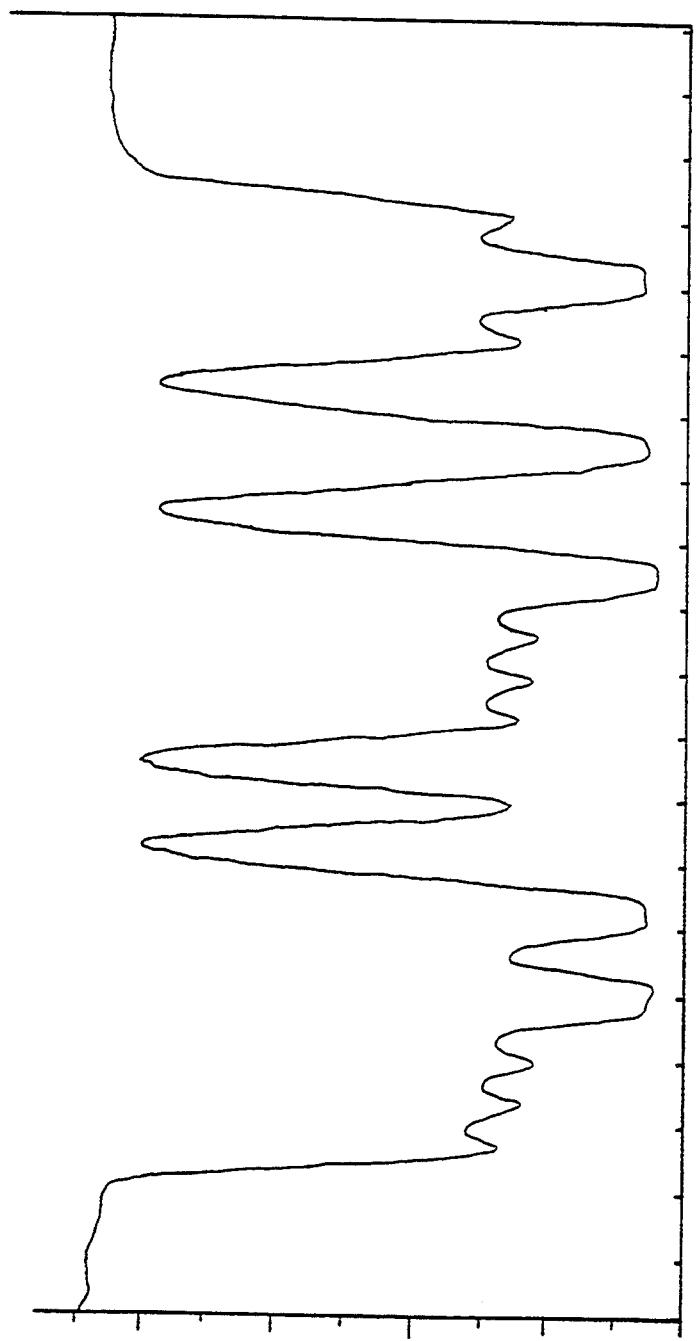
FIG. 19 is an example of the profile of a Interleaved 2 of 5 symbol taken with a scanner at a distance of 0.33 inch from the symbol.
Figure 20:
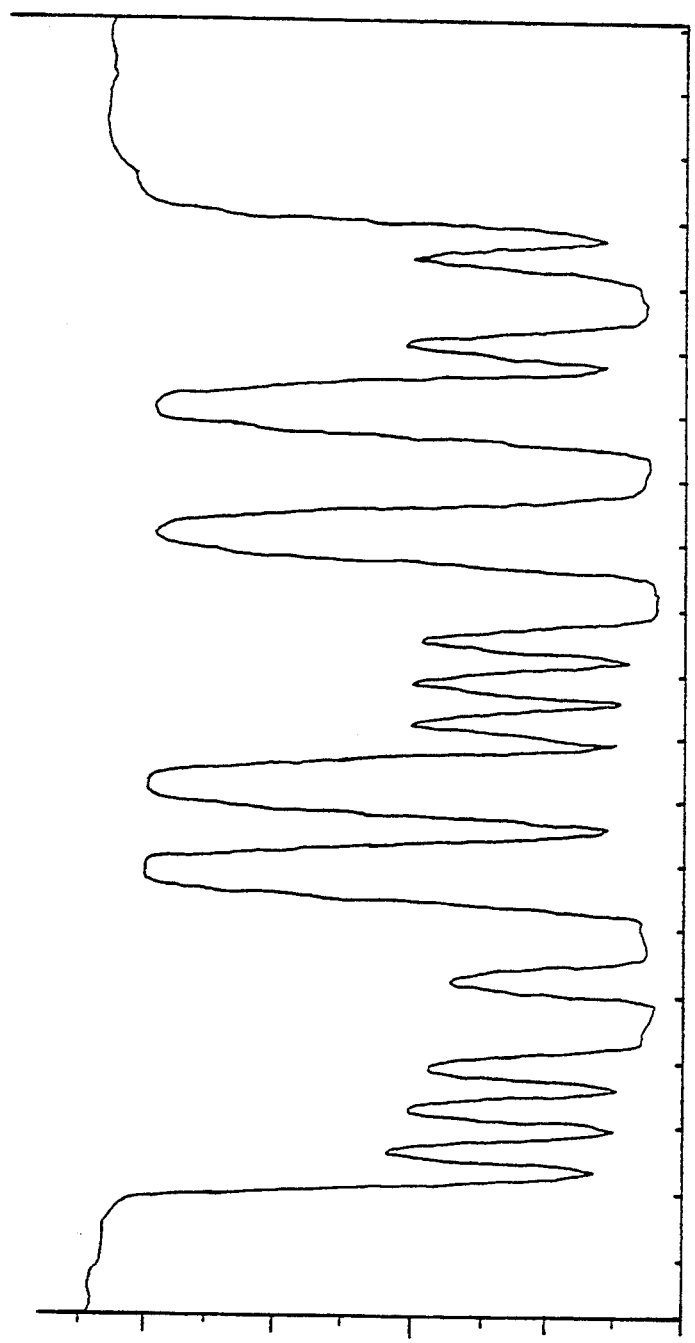
FIG. 20 is an example of the profile of a Interleaved 2 of 5 symbol taken with a scanner at a distance of 0.40 inch from the symbol.
Figure 21:
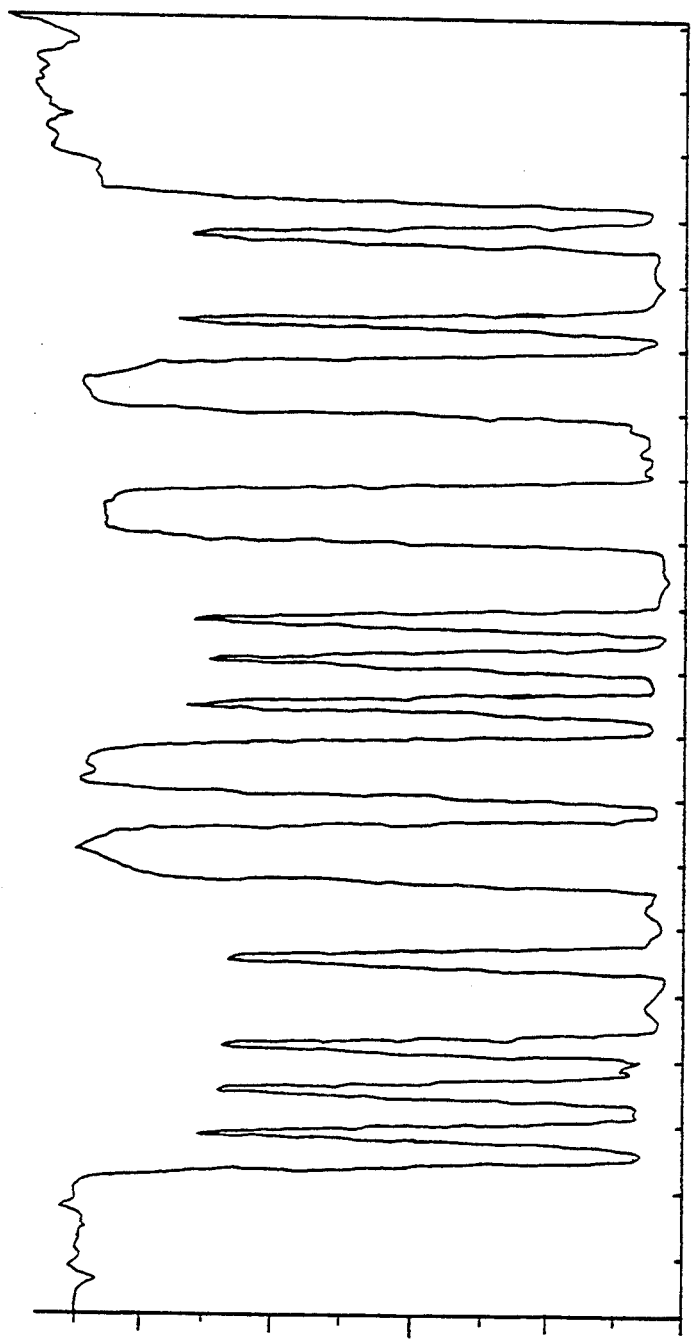
FIG. 21 is an example of the profile of a Interleaved 2 of 5 symbol taken with a scanner at a distance of 0.51 inch from the symbol.
Figure 22:
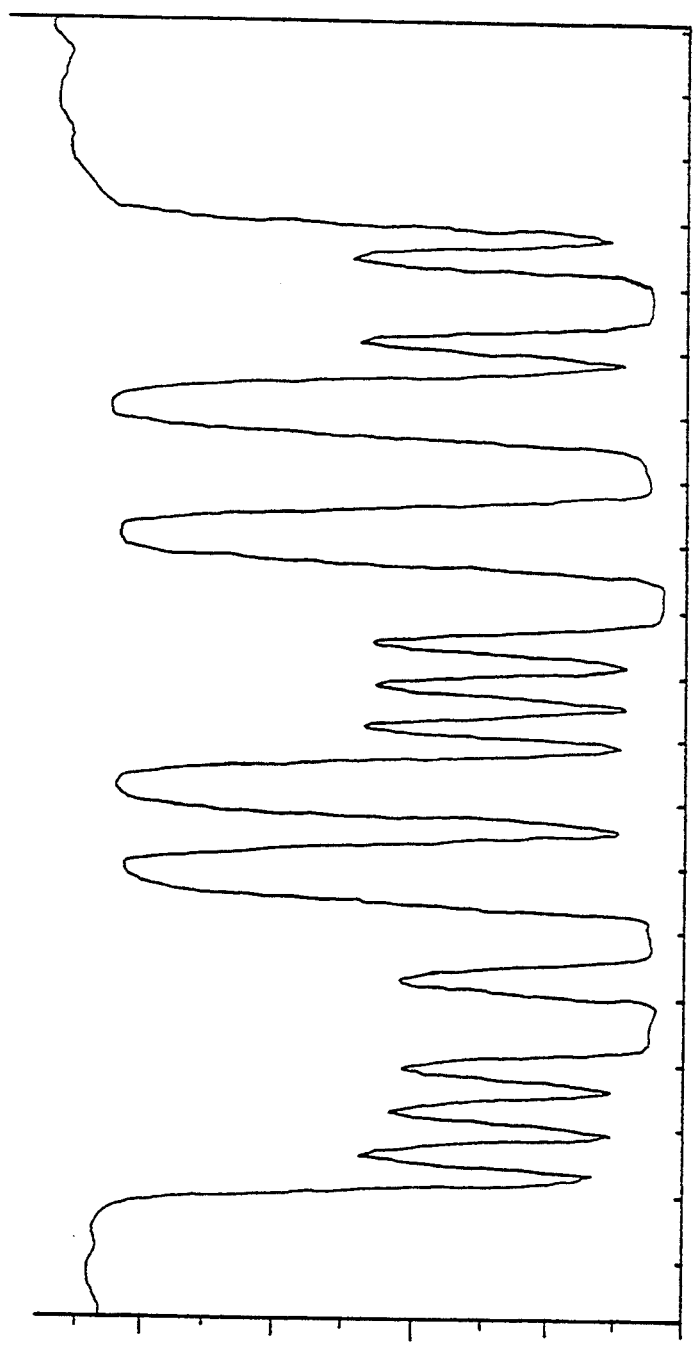
FIG. 22 is an example of the profile of a Interleaved 2 of 5 symbol taken with a scanner at a distance of 0.62 inch from the symbol.
Figure 23:
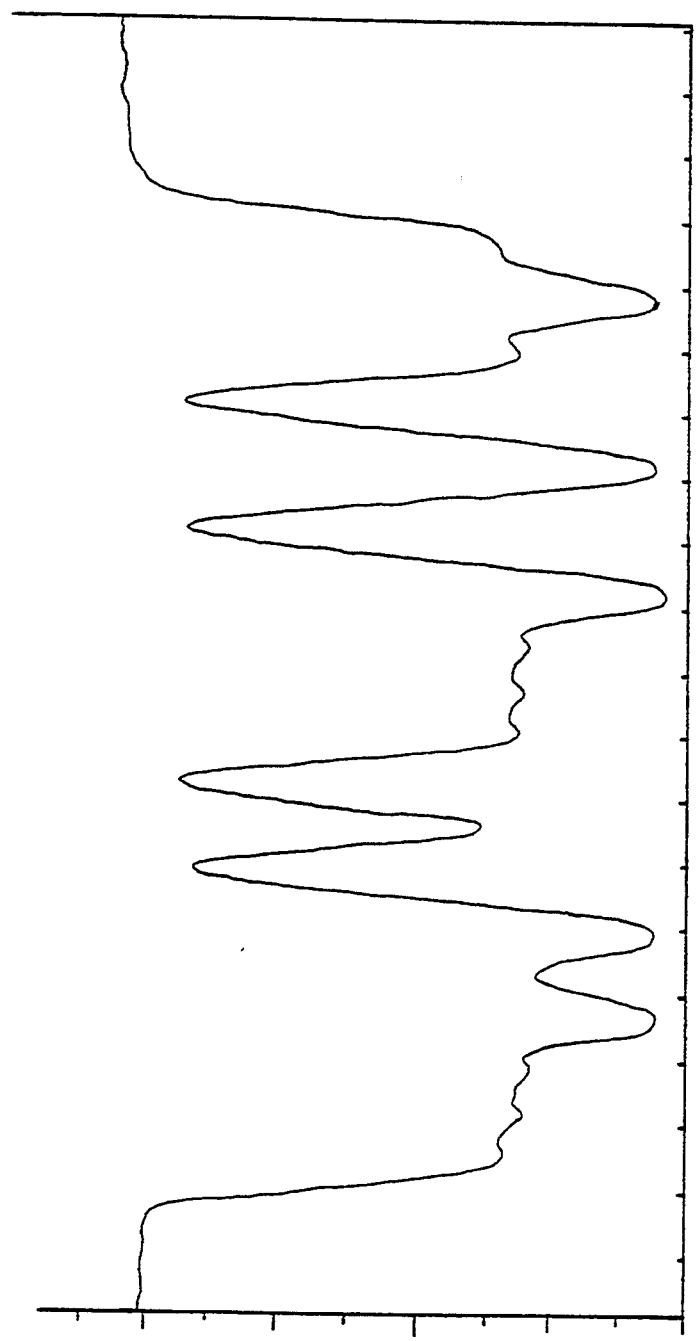
FIG. 23 is an example of the profile of a Interleaved 2 of 5 symbol taken with a scanner at a distance of 0.74 inch from the symbol.
Figure 24:
FIG. 24 is an example of the profile of a Interleaved 2 of 5 symbol taken with a scanner at a distance of 0.81 inch from the symbol.

11. Determine the characters and decode the symbol step 118. The easiest way to demonstrate the decode visually is to make a symbol with the missing elements and mark off the characters. FIG. 11 is a representation of the pattern where the narrow elements have been added between the wide ones and the characters have been delineated. The decoded data is shown below each character.

The final iteration of the decode matrix constructed using the above procedure is:

$$B\text{-}S,0\ 9$$
$$B\text{-}B,1\ 12 \quad B\text{-}S,2\ 15$$
$$B\text{-}B,3\ 18 \quad B\text{-}S,4\ 21$$
$$B\text{-}B,5\ 25 \quad B\text{-}S,6\ 28$$
$$B\text{-}B,7\ 31 \quad B\text{-}S,8\ 34$$

A generic decode process flow chart is given below:
Identify wide elements.
Measure wide element centers distances.
Identify start and stop wide elements.
Compare dimensions of start to stop, to gauge acceleration.
Make first matrix estimate for missing 0's, 1's and 2's.

Identify 0's, 1's and 2's.

Average all 0's, 1's and 2's in the symbol and revise matrix estimate for 3's and 4's if necessary.

Identify 3's and 4's.

Average all 3's and 4's and revise the matrix estimates for 5's and 6's if needed.

Identify 5's and 6's.

Average all 5's and 6's and revise the matrix estimates for 7's and 8's, if necessary.

Identify all 7's and 8's. Decode.

I2/5 Near-Closure Decode Example

Figure 4:
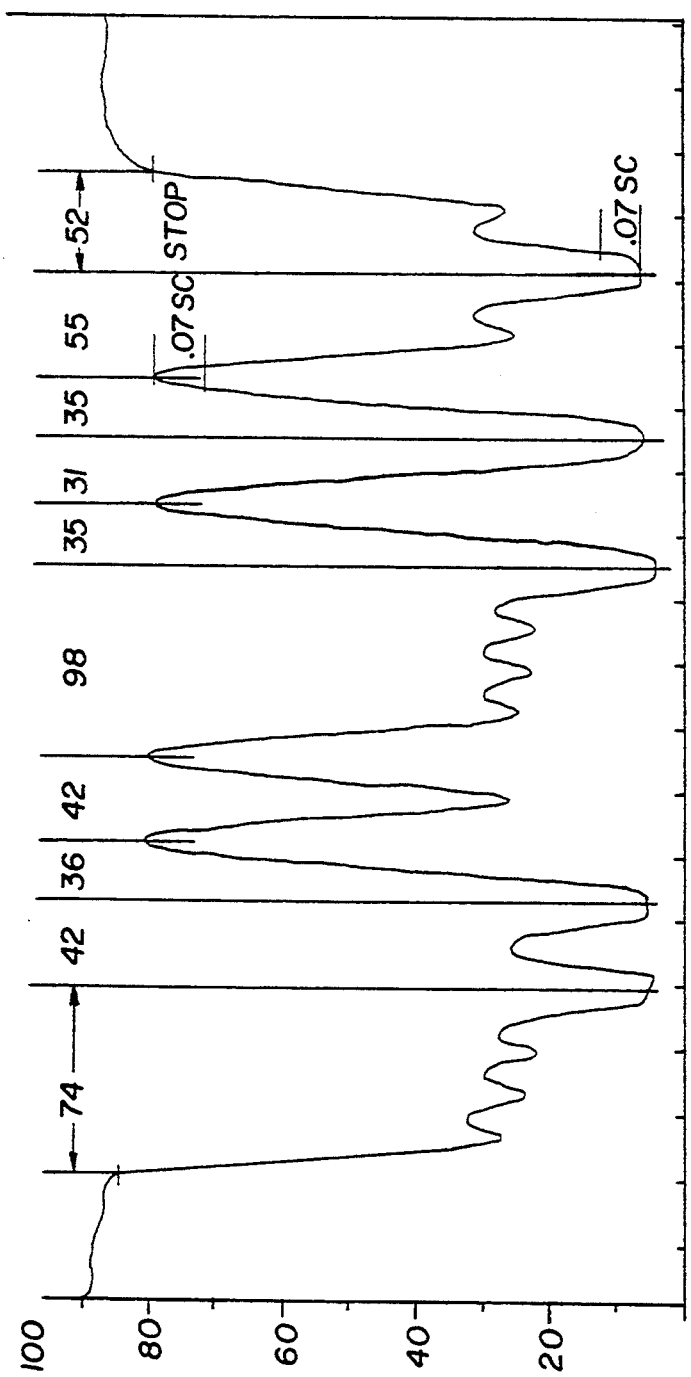
FIG. 4 is a second example of a method for locating the wide elements in a bar code symbol.
Figure 5:
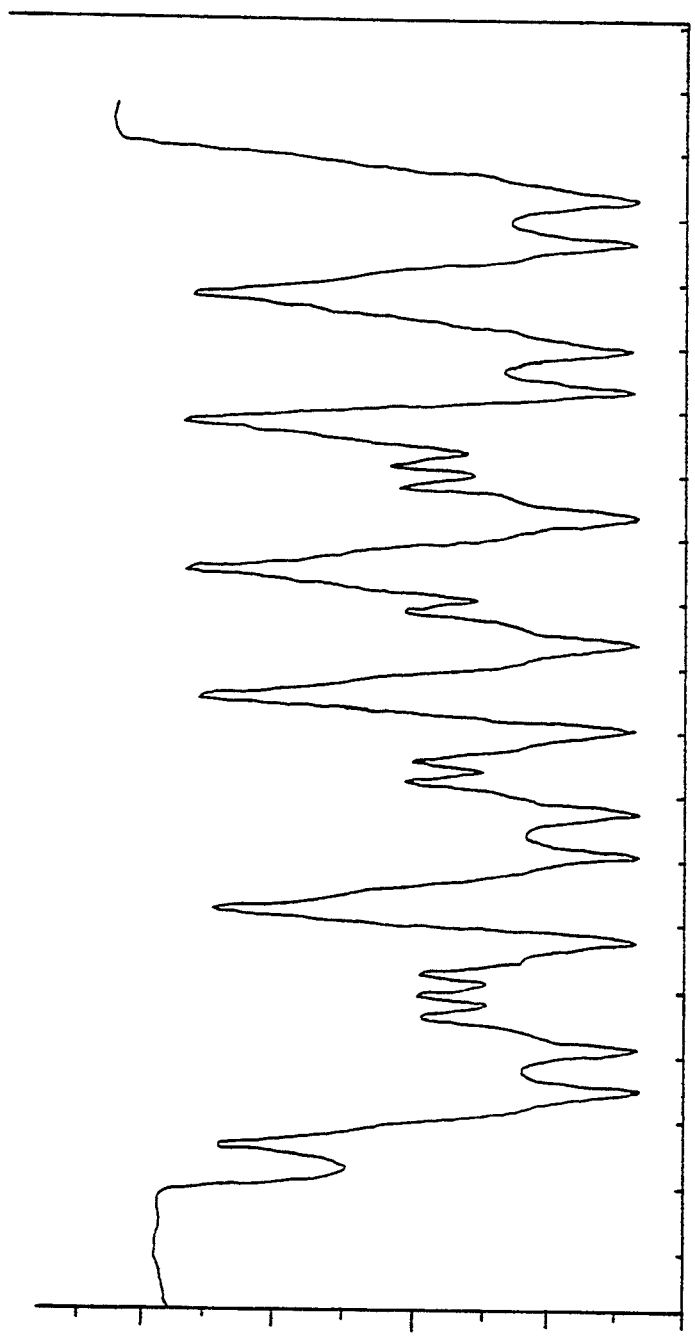
FIG. 5 is an example of the profile of a Code 39 symbol taken with a scanner at a distance of 0.14 inch from the symbol.

The profile in FIG. 4 was made on a positive ink spread TTR symbol with a 10 mil X-dimension using a 6 mil aperture in an Intermec 1301 scanner that was placed outside its normal depth of field by 50 percent. The resulting profile is well past the point where conventional circuits can find the elements. This example is used because the correct narrow elements are still visible as the small transitions between 20 and 40 percent reflectance. The ends of the symbol profile in FIG. 4 are indicated by small vertical lines. The centers of the resolved elements are also marked. The relative count between each resolved feature is indicated above the profile.

The I2/5 decode method is listed below in abbreviated form. The profile counts from FIG. 4 may be used for example.

```
Determine Rmax and Rmin which gives SC.
Run waveshaper 0.07SC
    if correct element count then decode
    steps 94 and 96 in FIG. 27A
    if element count too big then run waveshopper
0.14SC
        continue filtering routine
Test for closure
Run reverse waveshopper 0.07SC
    Locate centers of resolved elements
    Insure wide bars are less than Rmin + 0.07SC
    Insure wide spaces are greater than Rmaxspace −
0.07SC
Determine stop as lesser of first and last count
Determine stop tolerance as +/−10% of stop count
    if count is less than stop − tolerance then
        zero element pairs exist
    if count is between stop +/− tolerance, then
        one element pair exists
    Calculate unit as difference of zero, one or two
element counts
Count narrow elements to determine if any remain
Decode if possible
Determine unit as stop count divided by 3.25
    Verify unit measurement calculated above
    Add unit to stop count
    if count is less than stop + unit then
        two narrow bars present
    if count is between stop + unit and stop +
2*unit then
        three narrow bars are present
    Verify lost element count parity
        if wide elements are adjacent then parity
is odd
        if wide elements are opposite then parity
is even
Deduce remaining groups larger than three narrow bars
Decode
```

Other I2/5 Closure Examples

The peak and valley location method has also been used successfully on several profiles made with a focussed 10 mil aperture on a 3.3 mil symbol as well as on theoretical profiles in the same region and vision system profiles of 10 mil X-dimension symbols which were out-of-focus.

Variable Aperture Families

Code 39 profiles with varying resolution distortion are shown in FIGS. 5–11 and are displayed as a function of the distance from the scanner to the symbol. Note that the location of the wide elements is invariant throughout the closure and resolved regions. An I2/5 profile family is shown in FIGS. 18–26.

The closure profiles in FIGS. 5 and 12–26 were made with a fixed aperture in an out-of-focus configuration. The usual operating range for the Intermec 1301 fixed position focused aperture scanner is 0.4 to 0.6 inches from the symbol. The distances in the examples in FIGS. 5–11 range from 0.14 to 0.84 inches and the distances in the examples in FIGS. 18–26 range from 0.21 to 1.1 inches.

Figure 25:
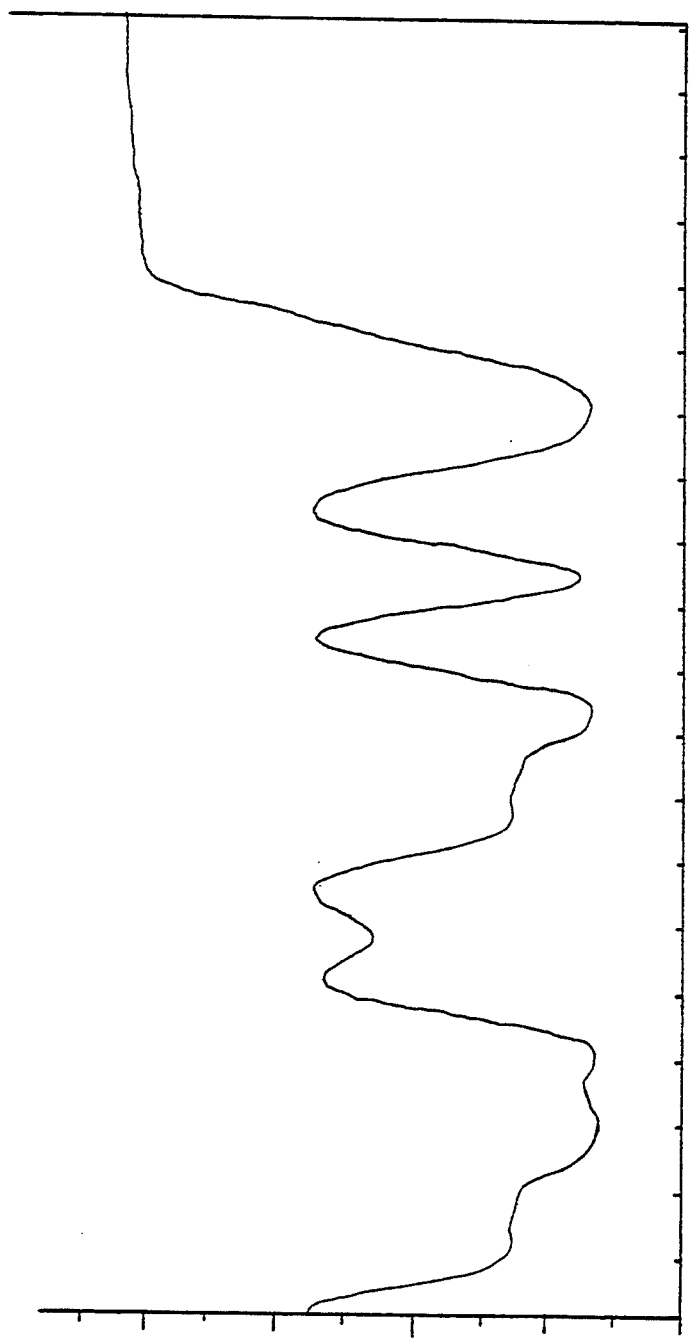
FIG. 25 is an example of the profile of a Interleaved 2 of 5 symbol taken with a scanner at a distance of 0.91 inch from the symbol.
Figure 26:
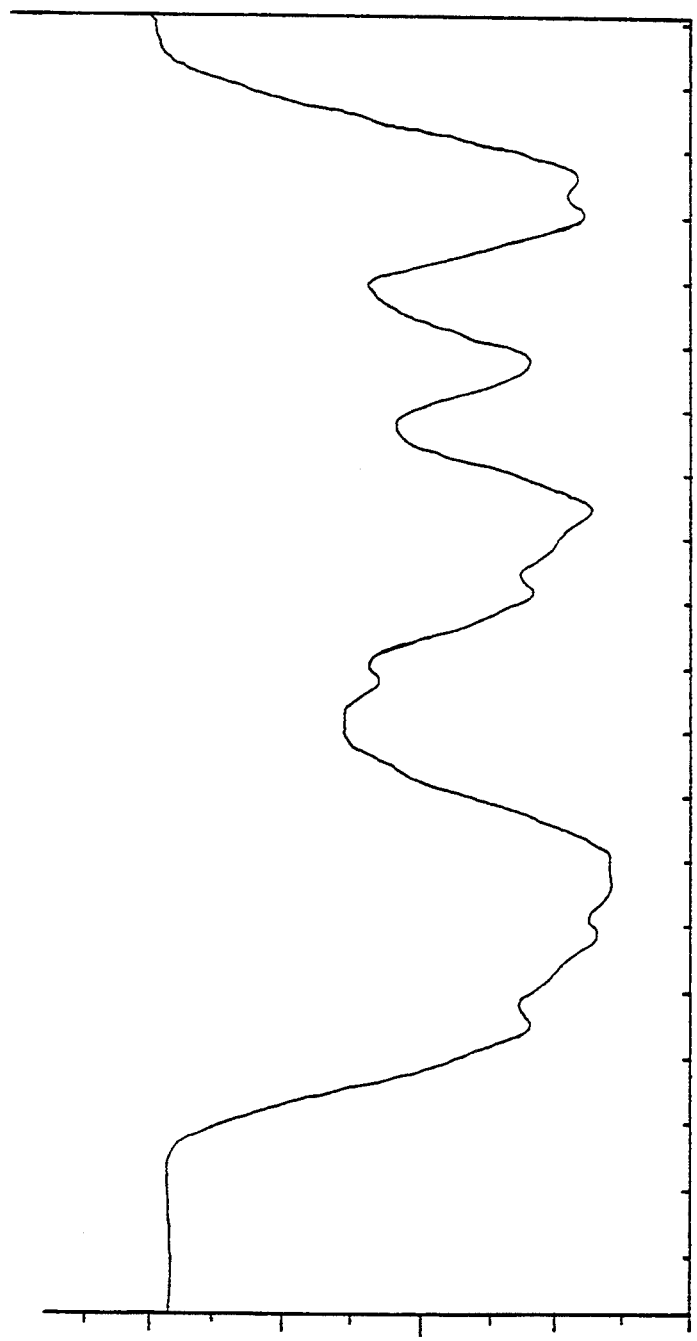
FIG. 26 is an example of the profile of a Interleaved 2 of 5 symbol taken with a scanner at a distance of 1.03 inch from the symbol.

Even though the aperture used to make the profiles shown in FIGS. 4, 5, and 12–26 is 20 percent larger than the standard aperture of an Intermec 1301 fixed position focused aperture scanner which operates from 0.4 to 0.6 inches, the profiles are easily decoded from 0.2 to 0.8 inches resulting in a depth of field 300 percent greater than the standard Intermec 1301 fixed position focused aperture scanner. It is difficult to make profiles with the scan head closer than 0.1 inches because of lighting limitations but profiles out to 1.1 inches are included. In FIG. 25, at 0.91 inches, the wide elements are all visible but may be difficult to discern in rudimentary software. At 1.03 inches (see FIG. 26), the wide bars will no longer pass a goodness test and have essentially moved beyond the closure region.

Conclusions

A robust quantitative decode method is described for any two element width symbology, such as the variable length Code 39 and I 2/5 symbologies, and which both filters out unwanted symbol defects as well as decodes successfully beyond the normal operating range of the scanner. The method is not dependent on inherently noisy slope information, although slope information can be used to augment this method. The method does not rely on complex deconvolution mathematics and does not require knowledge about the scanning configuration. The decoding method is a generic wide element decode process.

The peak and valley location method of decoding is inherently simple and straightforward to implement in a standard software language. The method gives an unambiguous decode of closure profiles. For I2/5, fixed length symbols should be used for the same short scan reasons that limit conventional I2/5 applications. Symbols which contain a symbol check character will exhibit higher data security. Closure decoding is shown to at least triple the usable depth of field achievable with a projected aperture scanning device.

While the detailed description above has been expressed in terms of a specific example, those skilled in the art will appreciate that many other circuits could be used to accomplish the purpose of the disclosed inventive apparatus and many other optical configurations such as laser, CCD imagers, LED and incandescent scanning devices. Accordingly, it can be appreciated that various modifications of the above-described embodiments may be made without departing from the spirit and the scope of the invention. Therefore, the spirit and the scope of the present invention are to be limited only by the following claims.

I claim:

1. Apparatus for decoding a machine readable symbol representing encoded information, the machine readable symbol including a plurality of relatively spaced two-dimensional geometric shapes, the geometric shapes and spaces therebetween having at least a narrow and a wide width in at least one dimension, comprising:

a sensor that receives light that is reflected from the machine readable symbol and produces an output signal therefrom;

a receiver that receives the output signal and produces a large shape signal indicative of the geometric shapes or spaces therebetween in the machine readable symbol having the wide widths in the one dimension, but failing to produce a signal indicative of other geometric shapes or spaces having the narrow widths; and means for processing the large shape signal and producing a signal indicative of the information encoded in the machine readable symbol, the means for processing including means for identifying in the large shape signal the geometric shapes or spaces in the machine readable symbol having the wide widths in the one dimension, memos for measuring the distances between the centers of the identified widths or spaces, and memos for determining a number and location of the spaces or widths of the other geometric shades in the machine readable symbol based on the measured distances.

2. The apparatus of claim 1 wherein the means for processing is a programmed computer.

3. The apparatus of claim 1 wherein the receiver produces a large shape signal that is indicative of both the spaces and the widths of the geometric shapes in the machine readable symbol.

4. The apparatus of claim 1, further comprising a light source that transmits light onto the machine readable symbol.

5. The apparatus of claim 1 wherein the sensor produces the output signal having an amplitude indicative of the reflectivity of the portion of the machine readable symbol being scanned for a time duration, the time duration of the amplitude representing the spacing of a wide space or width of a geometric shape in the portion of the machine readable symbol being scanned.

6. Apparatus for decoding a bar code symbol representing encoded information, the bar code symbol including a plurality of relatively spaced bars having at least a narrow and a wide width and the spaces between the bars having at least a narrow and a wide width, comprising:

means for receiving light that is reflected from the bar code symbol and producing an output signal therefrom;

means for receiving the output signal and producing a wide feature signal indicative of the wide widths of the bars or spaces, but failing to resolve the narrow widths of the bars and spaces in the bar code symbol; and means for processing the wide feature signal and producing a signal indicative of the information encoded in the bar code symbol therefrom based on centers of the bars and spaces having the wide widths.

7. The apparatus of claim 6 wherein the means for processing is a programmed computer.

8. The apparatus of claim 6 wherein the means for receiving the output signal and producing a wide feature signal produces a wide feature signal representing both the widths of the spaces and the widths of the bars in the bar code symbol.

9. The apparatus of claim 8 wherein the means for receiving light that is reflected from the bar code symbol and producing an output signal therefrom scans the bar code symbol generally in the direction of the widths of the spaces and bars of the bar code symbol and produces the output signal having an amplitude indicative of the reflectivity of the portion of the bar code symbol being scanned, the time duration of the amplitude being indicative of the width of the space or bar in the portion of the bar code symbol being scanned.

10. The apparatus of claim 6, further comprising means for transmitting light onto the bar code symbol.

11. The apparatus of claim 6 wherein the means for processing the wide feature signal includes means for identifying in the wide feature signal the bars and spaces having the wide widths.

12. The apparatus of claim 11 wherein the means for processing the wide feature signal includes means for measuring distances between the centers of the wide width bars and spaces in the wide feature signal.

13. The apparatus of claim 12 wherein the means for processing the wide feature signal includes means for identifying start and stop characters in the symbol from the identified wide width bars and spaces.

14. The apparatus of claim 13 wherein the means for processing the wide feature signal includes means for determining a symbol type from the wide width bars and spaces identified in the wide feature signal.

15. The apparatus of claim 13 wherein the means for processing the wide feature signal includes means for determining if the wide feature signal contains an acceleration distortion by comparing the distances between the wide width bars and spaces in the start characters.

16. The apparatus of claim 13 wherein the means for processing the wide feature signal includes means for determining a width of the bars or spaces having narrow widths based on the distances between the some of the wide width bars and spaces.

17. The apparatus of claim 16 wherein the means for processing the wide feature signal includes means for creating a lost element matrix that identifies a number of the narrow width bars and spaces between at least one of a wide width bar and space and another of a wide width bar and space in the wide feature signal.

18. The apparatus of claim 17 wherein the means for processing the wide feature signal includes means for identifying and locating all single narrow width bars and spaces unresolved in the wide feature signal.

19. The apparatus of claim 18 wherein the means for processing the wide feature signal includes means for averaging the distances between the wide width bars and spaces that contain the identified single narrow width bars or spaces.

20. The apparatus of claim 12 wherein the means for processing the wide feature signal includes means for identifying the distances between the wide width bars and spaces that contain at least a narrow width bar and a narrow width space from the measured distances in the wide feature signal.

21. Apparatus for decoding a bar code symbol representing encoded information, the bar code symbol including a plurality of relatively spaced having at least a narrow and a wide width in and the spaces between the bars having at least a narrow and a wide width, comprising:

means for receiving light that is reflected from the bar code symbol and producing an output signal therefrom;

means for receiving the output signal and producing a wide feature signal indicative of the bars or spaces having the wide widths, but failing to resolve the bars or spaces in the bar code symbol having the narrow widths;

means for generating in accordance a matrix of lost elements in response to the wide feature signal; and means for producing a signal indicative of the information encoded in the bar code symbol based on the matrix of lost elements.

22. The apparatus of claim 21 wherein the means for processing is a programmed computer.

23. The apparatus of claim 21 wherein the means for receiving the output signal and producing a wide feature signal produces a wide feature signal that is indicative of both the widths of the spaces and the widths of the bars in the bar code symbol.

24. The apparatus of claim 23 wherein the means for receiving light that is reflected from the bar code symbol and producing an output signal therefrom scans the bar code symbol generally in the direction of the widths of the spaces and bars of the bar code symbol and produces the output signal having an amplitude indicative of the reflectivity of the portion of the bar code symbol being scanned, the time duration of the amplitude being indicative of the width of the space or bar in the portion of the bar code symbol being scanned.

25. The apparatus of claim 21, further comprising means for transmitting light onto the bar code symbol.

26. Apparatus the decoding a bar code symbol representing encoded information, the bar code symbol including a plurality of relatively spaced bars having at least a narrow and a wide width and spaces between the bars having at least a narrow and a wide width, comprising:

a sensor that receives light reflected from the bar code symbol and produces an output signal therefrom;

a receiver that receives the output signal and produces a reflectance signal indicative of the spaces or the bars in the bar code symbol having the wide widths, but the reflectance signal failing to be indicative of the spaces or bars in the bar code symbol having the narrow widths; and a processor for processing the reflectance signal and producing a signal indicative of the information encoded in the bar code symbol based on the bars and spaces having the wide widths indicated in the reflectance signal.

27. The apparatus of claim 26 wherein the receiver produces a wide feature signal that is indicative of both the widths of the spaces and the widths of the bars in the bar code symbol.

28. The apparatus of claim 27 wherein the sensor scans the bar code symbol generally in the direction of the widths of the spaces and bars of the bar code symbol and produces the output signal having an amplitude indicative of the reflectivity of the portion of the bar code symbol being scanned for a time duration, the time duration of the amplitude being indicative of the width of the space or bar in the portion of the bar code symbol being scanned.

29. The apparatus of claim 27, further comprising a light source that transmits light onto the bar code symbol.

30. The apparatus of claim 26 wherein the means for processing is a programmed computer.

31. A method for decoding a bar code symbol representing encoded information, the bar code symbol including a plurality of relatively spaced bars having at least a narrow and a wide width and the spaces between the bars having at least a narrow and a wide width, comprising the steps of:

receiving light that is reflected from the bar code symbol and producing an output signal therefrom;

receiving the output signal and producing a wide feature signal indicative of the bars and spaces having the wide widths, but the wide feature signal not being indicative of the spaces and bars in the bar code symbol having the narrow widths; and processing the wide feature signal and producing a signal indicative of the information encoded in the bar code symbol, the step of processing the wide feature signal including the steps of identifying in the wide feature signal the spaces and bars having the wide widths, measuring distances between the centers of the identified spaces and bars, and determining a number and location of the spaces and bars having the narrow widths based on the measured distances.

32. The method of claim 31 wherein the step of receiving light that is reflected from the bar code symbol and producing an output signal therefrom scans the bar code symbol generally in the direction of the widths of the spaces and bars of the bar code symbol includes producing the output signal having an amplitude indicative of the reflectivity of the portion of the bar code symbol being scanned, the time duration of the amplitude representing the width of the space or bar in the portion of the bar code symbol being scanned.

33. The method of claim 31, further comprising the step of transmitting light onto the bar code symbol.

34. The method of claim 31 wherein the step of processing the wide feature signal includes identifying start and stop characters in the symbol from the identified spaces and bars.

35. The method of claim 31 wherein the step of processing the wide feature signal includes determining a symbol type from the identified spaces and bars in the wide feature signal.

36. The method of claim 31 wherein the step of processing the wide feature signal includes determining if the wide feature signal contains an acceleration distortion by comparing the distances between identified bars or spaces in the wide feature signal.

37. The method of claim 31 wherein the step of processing the wide feature signal includes creating a lost element matrix that identifies a number of the remaining width bars and spaces between identified bars or spaces in the wide feature signal.

38. The method of claim 31 wherein the step of processing the wide feature signal includes identifying the distances between the wide width bars and spaces that contain at least one of the remaining widths of the bars or spaces from the measured distances in the wide feature signal.

39. A method for decoding a bar code symbol representing encoded information, the bar code symbol including a plurality of relatively spaced bars having at least a narrow and a wide width, and the spaces between the bars having at least a narrow and a wide width, comprising the steps of:

receiving light that is reflected from the bar code symbol and producing an output signal therefrom;

receiving the output signal and producing a wide feature signal resolving the bars and spaces in the bar code symbol having the wide widths, but failing to resolve the bars and spaces having the narrow widths; and processing the wide feature signal and producing a signal indicative of the information encoded in the bar code symbol therefrom based on centers of the bars and spaces having the wide widths.

40. The method of claim 39 wherein the step of receiving the output signal and producing a wide feature signal includes producing a wide feature signal representing both the widths of the spaces and the widths of the bars in the bar code symbol.

41. The method of claim 40 wherein the step of receiving light that is reflected from the bar code symbol and producing an output signal therefrom scans the bar code symbol generally in the direction of the widths of the spaces and bars of the bar code symbol includes producing the output signal having an amplitude indicative of the reflectivity of the portion of the bar code symbol being scanned, the time duration of the amplitude representing the width of the space or bar in the portion of the bar code symbol being scanned.

42. The method of claim 39, further comprising the step of transmitting light onto the bar code symbol.

43. The method of claim 39 wherein the step of processing the wide feature signal includes the step of identifying in the wide feature signal the bars and spaces having the wide widths.

44. The method of claim 43 wherein the step of processing the wide feature signal includes measuring distances between the centers of the wide width bars and spaces in the wide feature signal.

45. The method of claim 44 wherein the step of processing the wide feature signal includes identifying start and stop characters in the symbol from the identified wide width bars and spaces.

46. The method of claim 45 wherein the step of processing the wide feature signal includes determining a symbol type from the wide width bars and spaces identified in the wide feature signal.

47. The method of claim 45 wherein the step of processing the wide feature signal includes determining if the wide feature signal contains an acceleration distortion by comparing the distances between the wide width bars and spaces in the start characters.

48. The method of claim 45 wherein the step of processing the wide feature signal includes determining a width of the bars or spaces having narrow widths based on the distances between the wide width bars and spaces.

49. The method of claim 48 wherein the step of processing the wide feature signal includes creating a lost element matrix that identifies a number of the narrow width bars and spaces between at least one of a wide width bar and space and another of a wide width bar and space in the wide feature signal.

50. The method of claim 49 wherein the step of processing the wide feature signal includes identifying and locating all single narrow width bars and spaces unresolved in the wide feature signal.

51. The method of claim 50 wherein the step of processing the wide feature signal includes averaging the distances between the wide width bars and spaces that contain the identified single narrow width bars or spaces.

52. The method of claim 44 wherein the step of processing the wide feature signal includes identifying the distances between the wide width bars and spaces that contain at least a narrow width bar and a narrow width space from the measured distances in the wide feature signal.

53. The method of claim 43 wherein the step of identifying the bars and spaces having the wide widths includes the steps of identifying peaks and valleys in the wide feature signals and bounding the peaks and valleys.

54. The method of claim 39 wherein the step of receiving the output signal includes the step of storing the wide feature signal.

55. A method for decoding a bar code symbol representing encoded information, the bar code symbol including a plurality of relatively spaced bars having at least a narrow and a wide width, and the spaces between the bars having at least a narrow and a wide width, comprising the steps of:

receiving light that is reflected from the bar code symbol and producing an output signal therefrom;

receiving the output signal and producing a wide feature signal resolving the bars and spaces in the bar code symbol having the wide widths, but failing to resolve the bars and spaces having the narrow widths;

processing the wide feature signal by generating a matrix of lost elements in response to the wide feature signal; and producing a signal indicative of the information encoded in the bar code symbol based on the matrix of lost elements.

56. The method of claim 55 wherein the step of receiving the output signal and producing a wide feature signal includes producing a wide feature signal that is indicative of both the widths of the spaces and the widths of the bars in the bar code symbol.

57. The method of claim 56 wherein the step of receiving light that is reflected from the bar code symbol and producing an output signal therefrom scans the bar code symbol generally in the direction of the widths of the spaces and bars of the bar code symbol includes producing the output signal having an amplitude indicative of the reflectivity of the portion of the bar code symbol being scanned, the time duration of the amplitude representing the width of the space or bar in the portion of the bar code symbol being scanned.

58. The method of claim 55, further comprising the step of transmitting light onto the bar code symbol.

59. The method of claim 55 wherein the step of processing the wide feature signal includes identifying in the wide feature signal the bars and spaces having the wide widths.

60. The method of claim 59 wherein the step of processing the wide feature signal includes measuring distances between the centers of the wide width bars and spaces in the wide feature signal.

61. The method of claim 60 wherein the step of processing the wide feature signal includes identifying start and stop characters in the symbol from the identified wide width bars and spaces.

62. The method of claim 61 wherein the step of processing the wide feature signal includes determining a symbol type from the wide width bars and spaces identified in the wide feature signal.

63. The method of claim 61 wherein the step of processing the wide feature signal includes determining if the wide feature signal contains an acceleration distortion by comparing the distances between the wide width bars and spaces in the start characters.

64. The method of claim 61 wherein the step of processing the wide feature signal includes determining a width of the bars or spaces having narrow widths based on the distances between the wide width bars and spaces.

65. The method of claim 61 wherein, in the step of processing the wide feature signal, the matrix of lost elements identifies a number of the narrow width bars and spaces between at least one of a wide width bar and space and another of a wide width bar and space in the wide feature signal.

66. The method of claim 65 wherein the step of processing the wide feature signal includes identifying and locating all single narrow width bars and spaces unresolved in the wide feature signal.

67. The method of claim 66 wherein the step of processing the wide feature signal includes averaging the distances between the wide width bars and spaces that contain the identified single narrow width bars or spaces.

68. The method of claim 60 wherein the step of processing the wide feature signal includes identifying the distances between the wide width bars and spaces that contain at least a narrow width bar and a narrow width space from the measured distances in the wide feature signal.

* * * * *

UNITED STATES PATENT AND TRADEMARK OFFICE
CERTIFICATE OF CORRECTION

PATENT NO.    : 5,389,770
DATED         : February 14, 1995
INVENTOR(S)   : H. Sprague Ackley It is certified that error appears in the above identified patent and that said Letters Patent is hereby corrected as shown below:

In column 15, claim 1, line 22, please delete "memos" and substitute therefor --means--.

In column 15, claim 1, line 24, please delete "memos" and substitute therefor -- means--.

In column 15, claim 1, line 26, please delete "shades" and substitute therefor --shapes--.

In column 16, claim 16, lines 40-41, please delete "some of the".

In column 16, claim 21 line 65, after "spaced", please insert --bars--.

In column 17, claim 21, line 9, please delete "in accordance".

In column 17, claim 26, line 33, please delete "the" and substitute therefor --for--.

Signed and Sealed this

Seventh Day of November, 1995

Attest:

BRUCE LEHMAN

*Attesting Officer*    *Commissioner of Patents and Trademarks*